US012641655B2

(12) United States Patent
Wang

(10) Patent No.: US 12,641,655 B2
(45) Date of Patent: May 26, 2026

(54) CONDITION-BASED METHOD AND DEVICE FOR ADDING SECONDARY NODE OR PRIMARY SECONDARY CELL

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 603 days.

(21) Appl. No.: 18/075,069

(22) Filed: Dec. 5, 2022

(65) Prior Publication Data

US 2023/0094897 A1    Mar. 30, 2023

Related U.S. Application Data

(63) Continuation of application No. PCT/CN2020/105975, filed on Jul. 30, 2020.

(51) Int. Cl.
*H04W 76/15* (2018.01)
*H04W 36/00* (2009.01)
*H04W 76/12* (2018.01)

(52) U.S. Cl.
CPC ....... *H04W 76/12* (2018.02); *H04W 36/0058* (2018.08); *H04W 36/00837* (2018.08)

(58) Field of Classification Search
None
See application file for complete search history.

(56) References Cited

U.S. PATENT DOCUMENTS

| | | | |
|---|---|---|---|
| 2015/0245260 A1 | 8/2015 | Engström | |
| 2018/0324651 A1 | 11/2018 | Tenny | |
| 2020/0163144 A1 | 5/2020 | Ryoo et al. | |
| 2020/0229054 A1 | 7/2020 | Lee | |
| 2022/0095176 A1* | 3/2022 | Lim | .......... H04W 36/0058 |

(Continued)

FOREIGN PATENT DOCUMENTS

| | | |
|---|---|---|
| CN | 106162765 A | 11/2016 |
| CN | 107690162 A | 2/2018 |
| CN | 109548095 A | 3/2019 |

(Continued)

OTHER PUBLICATIONS

NEC, "SgNB Initiated SN Modification procedure for Measurement Gap", 3GPP TSG-RAN WG3 #101bis R3-185713, Chengdu, China, Oct. 8-12, 2018.

(Continued)

*Primary Examiner* — Anez C Ebrahim
(74) *Attorney, Agent, or Firm* — BAYES PLLC

(57) ABSTRACT

A condition-based method and device for adding a Secondary Node (SN) or a Primary Secondary Cell (PSCell) are provided. In the method, configuration information for adding an SN/PSCell is received. An SN/PSCell is added using the configuration information for adding an SN/PSCell. The configuration information for adding an SN/PSCell includes at least one of: addition condition configuration information of the SN/PSCell; and configuration information of the SN/PSCell. The embodiments of the present disclosure may realize condition-based SN addition or PSCell addition.

20 Claims, 11 Drawing Sheets

300

Configuration information for adding a Secondary Node/Primary Secondary Cell (SN/PSCell) is received — S310

An SN/PSCell is added by using the configuration information for adding an SN/PSCell — S320

(56) References Cited

U.S. PATENT DOCUMENTS

2022/0394578 A1* 12/2022 Wu .................... H04W 36/362

FOREIGN PATENT DOCUMENTS

| CN | 110198545 A | 9/2019 |
| CN | 110198550 A | 9/2019 |
| CN | 110366198 A | 10/2019 |
| CN | 111212484 A | 5/2020 |
| EP | 3681202 A1 | 7/2020 |
| WO | 2020143054 A1 | 7/2020 |
| WO | 2020145736 A1 | 7/2020 |

OTHER PUBLICATIONS

International Search Report in the international application No. PCT/CN2020/105975, mailed on Apr. 26, 2021.
Written Opinion of the International Search Authority in the international application No. PCT/CN2020/105975, mailed on Apr. 26, 2021.
Intel Corporation, "Introduction of NR mobility enhancement", 3GPP TSG-RAN WG2 Meeting #109 electronic R2-2001748, Elbonia, Feb. 24-Mar. 6, 2020.
Huawei, "New WID on further enhancements on Multi-Radio Dual-Connectivity", 3GPP TSG RAN Meeting #86 RP-193249, Sitges, Spain, Dec. 9-12, 2019.
Qualcomm Incorporated: "Conditional NR PScell addition/change procedures", 3GPP Draft; R2-1912297, Brd Generation Partnership Project (3GPP), Mobile Competence Centre; 650, Route Deslucioles; F-06921 Sophia-Antipolis Cedex ; FRANCE, vol. RAN WG2, No. Chongqing, CN; Oct. 14, 2019-Oct. 18, 2019 Oct. 4, 2019 (Oct. 4, 2019), XP051804379, Chapter 2. Discussion, figure 1, 11 pages.
Qualcomm Incorporated: "On conditional PSCell addition/change", 3GPP Draft; R4-2000725, 3rd Generation Partnership Project (3GPP), Mobile Competence Centre; 650, Route Deslucioles; F-06921 Sophia-Antipolis Cedex; France, vol. Ran WG4, No. Online; Feb. 24, 2020-Mar. 6, 2020 Feb. 14, 2020 (Feb. 14, 2020), XP051850696, Chapter 1. Introduction, Chapter 2.2. Conditional PSCell addition requirements, 6 pages.
CATT: "Conditional PScell addition/change", 3GPP Draft; R2-1912133, 3rd Generation Partnership Project (3GPP), Mobile Competence Centre; 650, Route Deslucioles; F-06921 Sophia-Antipolis Cedex; France, vol. RAN WG2, No. Chongqing, P.R.China; Oct. 14, 2019-Oct. 18, 2019 Oct. 3, 2019 (Oct. 3, 2019), XP051804349, Chapter 2. Discussion, 4 pages.
Supplementary European Search Report in the European application No. 20947442.8, mailed on Jul. 7, 2023, 10 bages.
Huawei, "(TP for NR_Mob_enh BL CR for TS 38.423): Avoidance of simultaneous CHO and CPC configuration", 3GPP TSG-RAN WG3 #108-e, R3-203511, Jun. 1-11, 2020 E-Meeting, the whole document, 51 pages.
First Office Action of the Chinese application No. 202080101101.1, issued on May 28, 2024, 25 pages with English translation.
Second Office Action of the Chinese application No. 202080101101. 1, issued on Jul. 11, 2024, 31 pages with English translation.
Notice of Allowance of the Chinese application No. 202080101101. 1, issued on Sep. 2, 2024, 6 pages with English translation.

* cited by examiner

900

Configuration information for adding an SN/PSCell is sent to a terminal device. The
configuration information for adding an SN/PSCell includes at least one of:
addition condition configuration information of the SN/PSCell; or
configuration information of the SN/PSCell.
Optionally, the addition condition configuration information of the SN/PSCell includes
at least one of:
addition condition configuration information configured for each SN/PSCell; or
same addition condition configuration information configured for all SNs/PSCells

Configuration information for adding an SN/PSCell is sent to an MN. The configuration
information for adding an SN/PSCell includs at least one of:
addition condition configuration information of the SN/PSCell; or
configuration information of the SN/PSCell

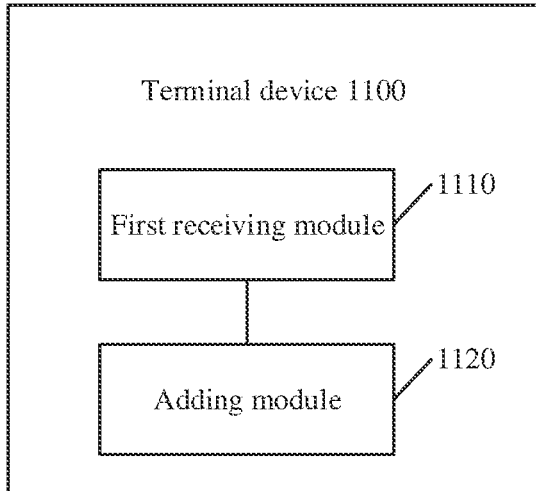

Terminal device 1100

First receiving module        1110

Adding module        1120

FIG. 11

CONDITION-BASED METHOD AND DEVICE FOR ADDING SECONDARY NODE OR PRIMARY SECONDARY CELL

CROSS REFERENCE TO RELATED APPLICATION

The present application is a continuation application of International Patent Application No. PCT/CN2020/105975, filed on Jul. 30, 2020, disclosure of the application is hereby incorporated by reference in its entirety.

BACKGROUND

At present, the adding process of the SN is that a Master Node (MN) reports based on the measurement of User Equipment (UE), and decides whether to add the SN or not. In R16 mobility enhancement project, condition-based handover and condition-based intra-SN PSCell change are proposed.

The condition-based handover is that a current cell configures a handover trigger condition and a target cell corresponding to the trigger condition as well as corresponding configuration information for the UE. When the UE measurement result meets the handover trigger condition, the handover to a pre-configured cell is triggered.

The condition-based PSCell change is that the SN configures a trigger condition of PSCell change and corresponding configuration of a target PSCell for the UE. When the UE measurement result meets the trigger condition of PSCell change, the change to the target PSCell cell is triggered.

At present, there is no condition-based SN addition or PSCell addition technology.

SUMMARY

Embodiments of the present disclosure provide a condition-based method and device for adding an SN or a PSCell, which can realize condition-based SN addition or PSCell addition.

The embodiments of the present disclosure propose a condition-based method for adding an SN or a PSCell, applied to a terminal device. The method may include the following operations. Configuration information for adding an SN/PSCell is received. The SN/PSCell is added using the configuration information for adding an SN/PSCell. The configuration information for adding an SN/PSCell may include at least one of: addition condition configuration information of the SN/PSCell; or configuration information of the SN/PSCell.

The embodiments of the present disclosure further propose a condition-based method for adding an SN or a PSCell, applied to an MN. The method may include the following operations. Configuration information for adding an SN/PSCell is sent to a terminal device. The configuration information for adding an SN/PSCell may include at least one of: addition condition configuration information of the SN/PSCell; or configuration information of the SN/PSCell.

The embodiments of the present disclosure propose a condition-based method for adding an SN or a PSCell, applied to a SN. The method may include the following operations. Configuration information for adding an SN/PSCell is sent to an MN. The configuration information for adding an SN/PSCell may include at least one of: addition condition configuration information of the SN/PSCell; or configuration information of the SN/PSCell.

The embodiments of the present disclosure propose a terminal device, including a memory for storing instructions, a processor and a transceiver. The transceiver is configured to receive configuration information for adding an SN/PSCell. The processor is configured to execute the instructions to add the SN/PSCell using the configuration information for adding an SN/PSCell. The configuration information for adding an SN/PSCell may include at least one of: addition condition configuration information of the SN/PSCell; or configuration information of the SN/PSCell.

The embodiments of the present disclosure propose a network device, including a transceiver. The transceiver is configured to send configuration information for adding an SN/PSCell to a terminal device. The configuration information for adding an SN/PSCell may include at least one of: addition condition configuration information of the SN/PSCell; or configuration information of the SN/PSCell.

The embodiments of the present disclosure propose a network device, including a transceiver. The transceiver is configured to send configuration information for adding an SN/PSCell to an MN. The configuration information for adding an SN/PSCell may include at least one of: addition condition configuration information of the SN/PSCell; or configuration information of the SN/PSCell.

BRIEF DESCRIPTION OF THE DRAWINGS

FIG. 9 is an implementation flowchart of a condition-based method 900 for adding an SN/PSCell according to an embodiment of the present disclosure.

FIG. 10 is an implementation flowchart of a condition-based method 1000 for adding an SN/PSCell according to an embodiment of the present disclosure.

FIG. 11 is a structural schematic diagram of a terminal device 1100 according to an embodiment of the present disclosure.

DETAILED DESCRIPTION

Figure 1:
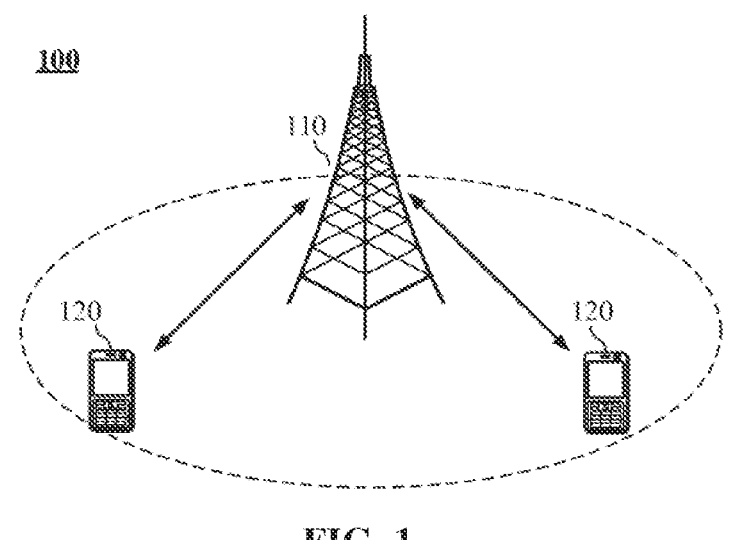
FIG. 1 is a schematic diagram I of an application scenario according to an embodiment of the present disclosure.

Technical solutions in the embodiments of the present disclosure will be described below in conjunction with the drawings in the embodiments of the present disclosure.

It is to be noted that terms "first", "second", etc., in the specification, claims, and drawings of the embodiments of the present disclosure are adopted not to describe a specific sequence or order but to distinguish similar objects. At the same time, the objects described by "first" and "second" may be the same or different.

The technical solution of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an NR system, an evolved system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN) and a Wireless Fidelity (WiFi), a 5th-generation (5G) communication system or another communication system.

Generally speaking, connections supported by a conventional communication system are usually limited in number and also easy to implement. However, along with the development of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication. The embodiments of the present disclosure may also be applied to these communication systems.

Optionally, the communication system in the embodiments of the present disclosure may be applied to a Carrier Aggregation (CA) scenario, may also be applied to a Dual Connectivity (DC) scenario and may further be applied to a Standalone (SA) network deployment scenario.

Spectrums to which the embodiments of the present disclosure are applied are not limited. For example, the embodiments of the present disclosure may be applied to a licensed spectrum or may be applied to an unlicensed spectrum.

Each of the embodiments of the present disclosure is described in conjunction with a network device and a terminal device. The terminal device may also be referred to as UE, an access terminal, a user unit, a user station, a mobile station, a mobile radio station, a remote station, a remote terminal, a mobile device, a user terminal, a terminal, a wireless communication device, a user agent, a user device, etc. The terminal device may be a STATION (ST) in WLAN, and may be a cell phone, a cordless phone, a Session Initiation Protocol (SIP) phone, a Wireless Local Loop (WLL) station, a Personal Digital Assistant (PDA), a handheld device with a radio communication function, a computing device or another processing device connected to a wireless modem, a vehicle device, a wearable device and a next-generation communication system, for example, a terminal device in an NR network, a terminal device in a future evolved Public Land Mobile Network (PLMN) or the like.

As an example rather than restriction, in the embodiments of the present disclosure, the terminal device may also be a wearable device. The wearable device, also referred to as a wearable intelligent device, is a generic term of wearable devices obtained by performing intelligentization designing and development on daily wearing products, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to application functions of a certain type and required to be matched with other devices such as intelligent phones for use.

The network device may be a device configured to communicate with a mobile device. The network device may be an Access Point (AP) in the WLAN and a Base Transceiver Station (BTS) in the GSM or CDMA, or may be a NodeB (NB) in WCDMA, or may be an Evolutional Node B (eNB or eNodeB) in LTE, or a relay ST or AP, or a vehicle device, a wearable device, a network device (gNB) in the NR network, a network device in the future evolved PLMN, or the like.

In the embodiments of the present disclosure, the network device provides service for a cell, and the terminal device communicates with the network device through a transmission resource (for example, a frequency-domain resource or a spectrum resource) for the cell. The cell may be a cell corresponding to the network device (for example, a base station). The cell may belong to a macro base station or a base station corresponding to a small cell. Here, the small cell may include: a metro cell, a micro cell, a pico cell, a femto cell and the like. These small cells have the characteristics of small coverage and low transmitted power and are suitable for providing high-rate data transmission service.

A network device 110 and two terminal devices 120 are exemplarily shown in FIG. 1. Optionally, the radio communication system 100 may include multiple network devices 110 and another number of terminal devices 120 may be included in coverage of each network device 110. There are no limits made thereto in the embodiments of the present disclosure. The embodiments of the present disclosure may be applied to one terminal device 120 and one network device 110, and may also be applied to one terminal device 120 and another terminal device 120.

Optionally, the radio communication system 100 may further include other network entities such as a Mobility Management Entity (MME), and an Access and Mobility Management Function (AMF), which is not limited in the embodiment of the present disclosure.

It is to be understood that terms "system" and "network" in the disclosure may usually be exchanged herein. The term "and/or" herein describes only an association relationship for describing associated objects and represents that three relationships may exist. For example, A and/or B may represent the following three cases: Only A exists, both A and B exist, and only B exists. In addition, character "/" herein usually represents that previous and next associated objects form an "or" relationship.

Figure 2:
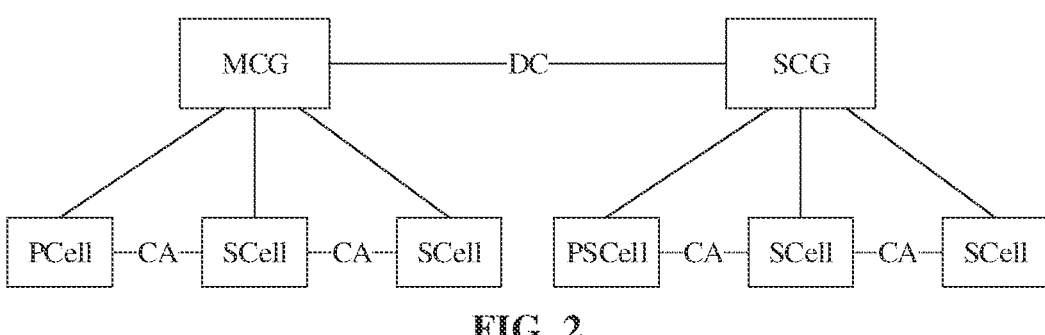
FIG. 2 is a schematic diagram II of an application scenario according to an embodiment of the present disclosure.

The embodiment of the present disclosure proposes a condition-based method for adding an SN/PSCell. The method is applied to a Dual Connectivity (DC) network including UE, a Master Cell Group (MCG) and a Secondary Cell Group (SCG). An MCG and an SCG are exemplarily shown in FIG. 2. MCG may be simply understood as a cell group where the cell in which UE initiates random access for the first time is located. Under the MCG, there may be a plurality of cells, one of which, configured to initiate initial access is called a Primary Cell (PCell). The PCell under the MCG and a Secondary Cell (SCell) under the MCG are combined by a Carrier Aggregation (CA) technology. The UE accesses each cell in the MCG through an MN. Similarly, there may be one most important cell under the SCG, namely PSCell, which may also be simply understood as the cell that initiates initial access under SCG. The PSCell under the SCG and the SCell under the SCG are also combined by the CA technology. The UE accesses each cell in the SCG through an SN.

Figure 3:
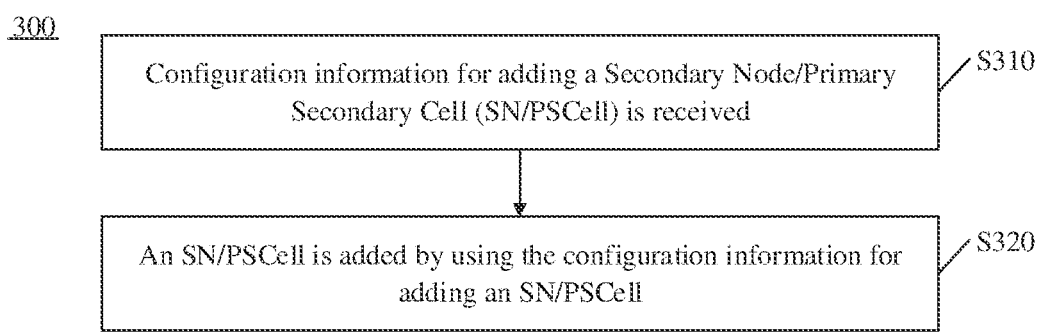
FIG. 3 is an implementation flowchart of a condition-based method 300 for adding an SN/PSCell according to an embodiment of the present disclosure.

FIG. 3 is an implementation flowchart of a condition-based method 300 for adding an SN/PSCell according to an embodiment of the present disclosure. The method may optionally be applied to the system shown in FIGS. 1 and 2, but is not limited thereto. The method may be applied to UE. The method includes at least part of the following contents.

At S310, configuration information for adding an SN/PSCell is received.

At S320, the SN/PSCell is added using the configuration information for adding an SN/PSCell.

Herein, the configuration information for adding an SN/PSCell includes at least one of:

addition condition configuration information of the SN/PSCell; or configuration information of the SN/PSCell.

Optionally, the addition condition configuration information of the SN/PSCell includes at least one of:

addition condition configuration information configured for each SN/PS Cell; or same addition condition configuration information configured for all SNs/PSCells.

The addition condition configuration information of the above SN/PSCell may be determined by the MN according to a measurement result of the UE, and sent to the UE by the MN. Or, the MN sends the measurement result of the UE to each candidate SN, and each candidate SN determines the addition condition configuration information of the SN/PSCell according to the measurement result of the UE, and sends same to the UE through the MN.

Optionally, the configuration information of the above SN/PSCell is at least provided with the following two forms.

For the first form, the configuration information of the above SN/PSCell includes at least one of:

configuration information of the PSCell in the SN;

configuration information of at least one SCell in the SN; and addition condition configuration information of at least one SCell in the SN.

For the second form, the configuration information of the above SN/PSCell includes at least one of:

configuration information of at least one PSCell in the SN and corresponding PS Cell condition configuration information;

configuration information of a default PSCell;

configuration information of at least one SCell in the SN; and addition condition configuration information of at least one SCell in the SN.

The difference between the above two forms is that in the first form, which cell in the SN is the PSCell is already determined in the configuration information of the SN/PSCell. In the second form, the configuration information of the SN/PSCell provides a condition for each cell in the SN to become the PSCell (such as the above corresponding PSCell condition configuration information), and a default PSCell is given. Upon receiving the configuration information of the SN/PSCell, the UE judges whether each cell in a target SN meets the condition of becoming the PSCell, and determines the cell that meets the condition as the PSCell. If each cell does not meet the condition of becoming the PSCell, the above default PSCell is selected as the PSCell.

The configuration information of the above SN/PSCell may be determined by the MN according to a measurement result of the UE, and sent to the UE by the MN. Or, the MN sends the measurement result of the UE to each candidate SN, and each candidate SN determines the configuration information of the SN/PSCell according to the measurement result of the UE, and sends same to the UE through the MN.

In some implementations, before S301, the following operations may also be included.

The measurement result of the terminal device is sent to the MN, and the measurement result is used to generate the above configuration information for adding an SN/PSCell.

In some implementations, the addition condition configuration information of the above SN/PSCell is at least provided with a plurality of forms as follows.

When the MN is an NR base station (gNB), if the SN is an LTE base station (eNB), the addition condition configuration information of the above SN/PSCell is based on a B1 event.

When the MN is an NR base station (gNB), if the SN is an NR base station (gNB), the addition condition configuration information of the above SN/PSCell is based on an A4 event.

When the MN is an LTE base station (eNB), if the SN is an LTE base station (eNB), the addition condition configuration information of the above SN/PSCell is based on an A4 event.

When the MN is an LTE base station (eNB), if the SN is an NR base station (gNB), the addition condition configuration information of the above SN/PSCell is based on a B1 event.

The configuration information for adding an SN/PSCell may also include at least one of:

an SCG counter; or an identifier (ID) of at least one SN/PSCell.

In some implementations, the addition condition configuration information of the above SN/PSCell may be related to an entity that configures the condition.

For example, if the addition condition configuration information of the SN/PSCell is configured by the SN, the addition condition configuration information of the SN/PSCell is based on A3 and B5 events.

If the addition condition configuration information of the SN/PSCell is configured by the MN, the addition condition configuration information of the SN/PSCell is based on a B1 event.

Herein, the above events have the following meanings.

An A1 event represents that the measurement value of a serving cell (such as Reference Signal Receiving Power (RSRP) or Reference Signal Receiving Quality (RSRQ)) is greater than a threshold value.

An A2 event represents that the measurement value of the serving cell (such as RSRP or RSRQ) is less than the threshold value.

An A3 event represents that the measurement value of a neighboring cell is better than the measurement value of the serving cell by a certain threshold value.

An A4 event represents that the measurement value of the neighboring cell is greater than the threshold value.

An A5 event represents that the measurement value of the serving cell is less than threshold 1, while the channel quality of the neighboring cell is greater than threshold 2.

An A6 event represents that the signal quality of the neighboring cell is better than Scell by a certain threshold value.

A B1 event represents that the channel quality of the neighboring cell with different technologies is greater than the threshold.

A B2 event represents that the channel quality of the serving cell is less than threshold 1, while the channel quality of the neighboring cell with different technologies is greater than threshold 2.

Optionally, S320 may include the following operations.

The UE judges whether the current condition meets the addition condition configuration information of the above SN/PSCell, and when the current condition meets the addition condition configuration information of the SN/PSCell, a random access process is initiated to the SN/PSCell corresponding to the addition condition configuration information of the SN/PSCell.

Specifically, the UE may initiate the random access process to the target SN/PSCell, and the target SN/PSCell informs the MN to trigger data forwarding, activate a GPRS Tunnelling Protocol (GTP) tunnel and/or establish a GTP tunnel. Herein, data forwarding may include MN forwarding data to SN, and/or User Plane Function (UPF) sending data to SN. GTP tunnel activation may include GTP tunnel activation from MN to SN, and/or GTP tunnel activation from UPF to SN. The operation of establishing a GTP tunnel may include the SN establishing a GTP tunnel from MN to SN through the MN, and the MN replying the SN to establish the GTP tunnel from the SN to the MN. Through the MN, the SN establishes a GTP tunnel from the UPF to the SN, and the MN informs the UPF of a Tunnelling Endpoint Identifier (TEID) informed by the SN. The UPF informs the MN about the GTP tunnel from the SN to the UPF, and the MN informs the SN of the GTP TEID allocated by the UPF, which supports the completion of tunnel establishment. Detailed description is made to tunnel establishment, activation and data forwarding process in the following embodiments.

The above describes a condition-based method for adding an SN/PSCell applied to UE proposed by the embodiment of the present disclosure. According to the received configuration information for adding an SN/PSCell, the UE performs condition-based SN addition or PSCell addition. Herein, the configuration information for adding an SN/PSCell is calculated by the MN or SN according to the measurement result reported by the UE, and a calculation result is sent to the UE. The following specific embodiments are given to introduce the interaction among various entities.

Embodiment I

In the embodiment, the MN determines the addition condition configuration information of the SN/PSCell, and the SN gives the configuration information of the above SN/PSCell according to the addition condition configuration information of the SN/PSCell. Then, the MN sends the addition condition configuration information of the SN/PSCell and the configuration information of the SN/PSCell to the UE.

Figure 4:
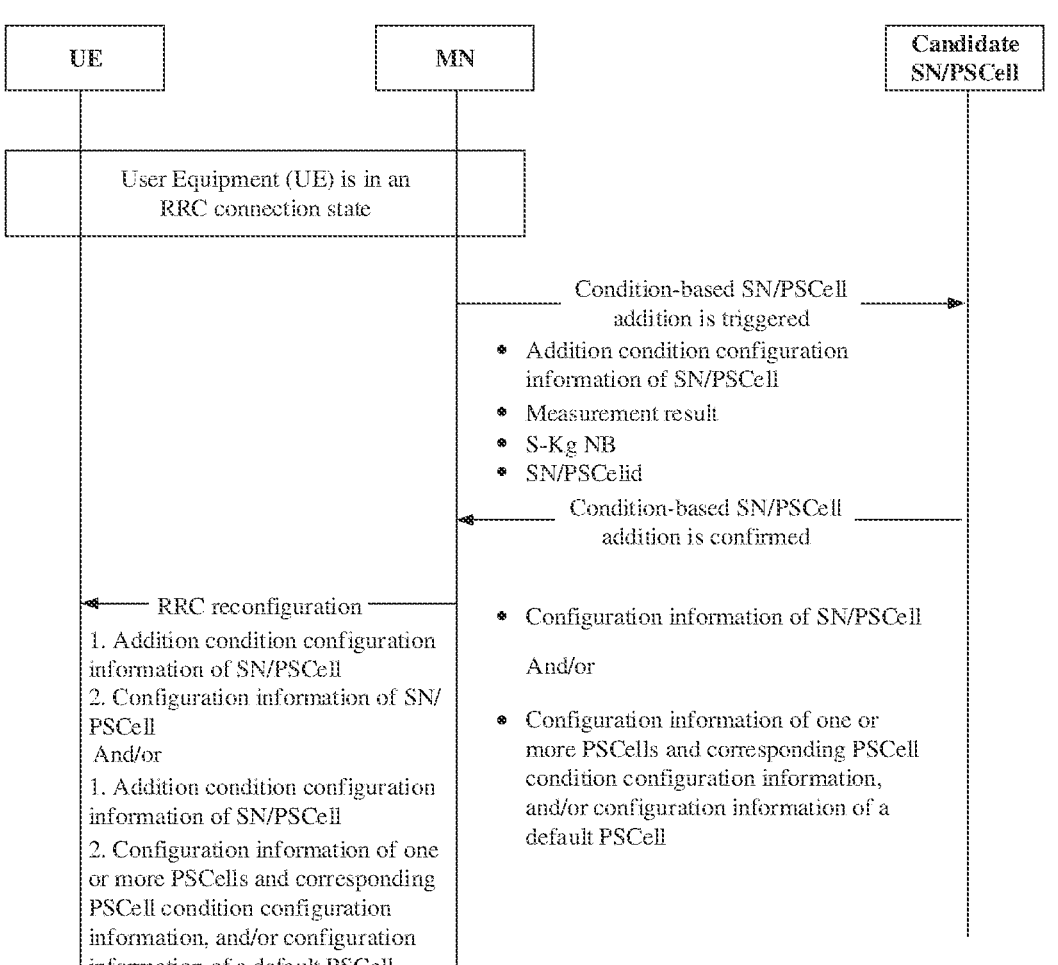
FIG. 4 is an implementation flowchart according to an embodiment I of the application.

FIG. 4 is an implementation flowchart according to an embodiment I of the application. As shown in FIG. 4, the following steps are included.

At S1: An RRC connection is established between the UE and the MN (such as gNB1), and signaling bearer (SRB) and service data bearer (DRB) are established. The UE reports the measurement result of the UE to gNB1.

At S2, according to the measurement result, gNB1 decides an appropriate candidate SN/PSCell set, and generates the addition condition configuration information of the SN/PSCell. Herein, the addition condition configuration information of the SN/PSCell is set for each candidate SN/PSCell, or is common for all candidate SNs/PSCells.

At S3, gNB1 forwards the measurement result reported by the UE to each candidate SN/PSCell, and/or sends the addition condition configuration information generated in S2 for the candidate SN/PSCell.

Optionally, gNB1 may further send a condition addition instruction to each candidate SN/PSCell, and the instruction is used to inform the candidate SN/PSCell to generate the configuration information of the SN/PSCell according to the measurement result of the UE.

Optionally, gNB1 may send the ID of at least one candidate SN/PSCell, and/or S-KgNB, and/or the configuration information of at least one SCell in the SN to each candidate SN/PSCell. Herein, S-KgNB is a key of the SN/PSCell.

At S4: the candidate SN/PSCell sends the SN/PSCell configuration information in the SN to gNB1; or the configuration information of one or more PSCells and the corresponding PSCell condition configuration information, and/or the configuration information of a default PSCell is sent to gNB1. Herein, the corresponding PSCell condition configuration information may refer to a condition that each Cell in the SN becomes the PSCell. The default PSCell may refer to the default PSCell in the SN.

At S5, gNB1 sends the addition condition configuration information of the candidate SN/PSCell and the configuration information of the corresponding SN/PSCell to the UE.

Or, gNB1 sends the addition condition configuration information of the candidate SN/PSCell, as well as the configuration information of one or more PSCells and the corresponding PSCell condition configuration information, and/or the configuration information of the default PSCell to the UE.

Further, gNB1 may also send the SCG counter, and/or the ID of the candidate SN/PSCell, and/or an SCell list and the configuration thereof to the UE.

At S6, when the UE executes measurement, it is evaluated whether each candidate SN meets the addition condition configuration information and/or SN/PSCell configuration information of the SN/PSCell or not. If so, the UE initiates a random access process to a target SN/PSCell that meets the condition.

Optionally, if gNB1 sends the configuration information of the PSCell in the target SN to the UE in the S5 above, that is, gNB1 already configures the PSCell in the target SN for the UE, the UE may initiate the random access process to the PSCell in this step.

Or, if gNB1 sends the configuration information of one or more PSCells and corresponding PSCell condition configuration information to the UE in the S5 above, that is, gNB1 already informs the UE of the condition for each cell in the target SN to become the PSCell. In the step, the UE may determine which cell in the target SN meets the PSCell condition configuration information, take the cell meeting the PSCell condition configuration information as the PSCell, and initiate the random access process to the PSCell. The UE initiates the random access process to the default PSCell if all current cells do not meet the corresponding PSCell condition configuration information.

Embodiment II

In the embodiment, the SN/PSCell determines the addition condition configuration information of the SN/PSCell, and gives the SN/PSCell configuration information at the same time; and the SN sends the determined information to the UE through the MN.

Figure 5:
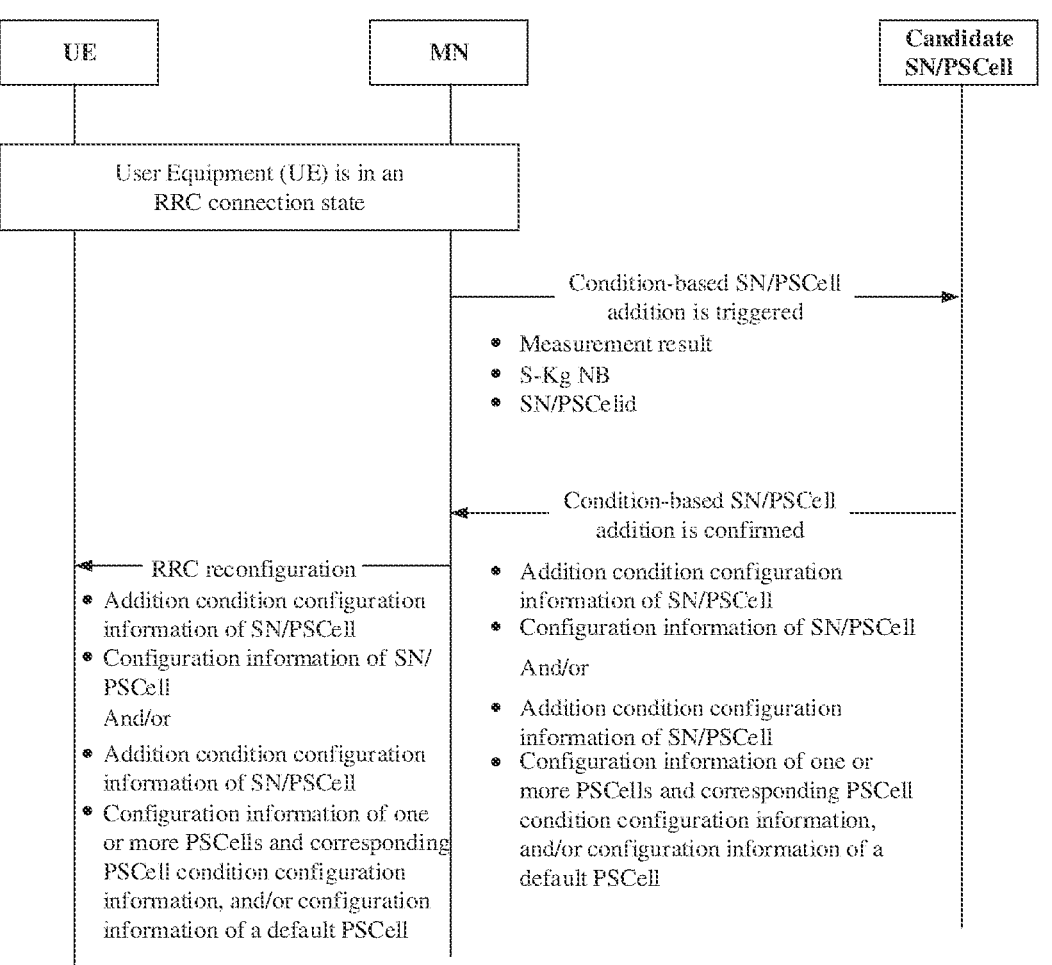
FIG. 5 is an implementation flowchart according to an embodiment II of the application.

FIG. 5 is an implementation flowchart according to an embodiment II of the application. As shown in FIG. 5, the following steps are included.

At S1: An RRC connection is established between the UE and the MN (such as gNB1), and signaling bearer (SRB) and service data bearer (DRB) are established. The UE reports the measurement result of the UE to gNB1.

At S2, according to the measurement result, gNB1 decides an appropriate candidate SN/PSCell set. gNB1 forwards the measurement result reported by the UE to each candidate SN/PSCell. Optionally, gNB1 may further send a condition configuration instruction to each candidate SN/PSCell, and the instruction is used to inform the candidate SN/PSCell to generate configuration information for adding an SN/PSCell (including the addition condition configuration information of the SN/PSCell and the configuration information of the SN/PSCell) according to the measurement result of the UE.

At S3, the candidate SN/PSCell generates the addition condition configuration information of the SN/PSCell and the configuration information of the SN/PSCell. And same is sent to gNB1.

Optionally, the candidate SN/PSCell may send gNB1 at least one of:

addition condition configuration information of the SN/PSCell; or configuration information of the SN/PSCell in the SN.

Or, the candidate SN/PSCell may send gNB1 at least one of:

addition condition configuration information of the SN/PSCell; or configuration information of one or more PSCells and the corresponding PSCell condition configuration information, and/or the configuration information of a default PSCell. Herein, the corresponding PSCell condition configuration information may refer to a condition that each Cell in the SN becomes the PSCell. The default PSCell may refer to the default PSCell in the SN.

At S4, gNB1 sends the S-KgNB to the candidate SN/PSCell after receiving the information sent by the candidate SN/PSCell. Or, gNB1 may send the S-KgNB to the candidate SN/PSCell when forwarding the measurement result of the UE or sending the condition configuration instruction (as in S2 above).

At S5, gNB1 sends the condition configuration information of the candidate SN/PSCell and the configuration information of the corresponding SN/PSCell to the UE.

Or, gNB1 sends the condition configuration information of the candidate SN/PSCell, as well as the configuration information of one or more PSCells and the corresponding PSCell condition configuration information, and/or the configuration information of the default PSCell to the UE.

Further, gNB1 may also send the SCG counter, and/or the ID of the candidate SN/PSCell, and/or an SCell list and the configuration thereof to the UE.

At S6, when the UE executes measurement, it is evaluated whether each candidate SN meets the addition condition configuration information of the SN/PSCell and/or SN/PSCell configuration information or not. If so, the UE initiates a random access process to a target SN/PSCell that meets the condition.

Optionally, if gNB1 sends the configuration information of the PSCell in the target SN to the UE in the S5 above, that is, gNB1 already configures the PSCell in the target SN for the UE, the UE may initiate the random access process to the PSCell in this step.

Or, if gNB1 sends the configuration information of one or more PSCells and corresponding PSCell condition configuration information to the UE in the S5 above, that is, gNB1 already informs the UE of the condition for each cell in the target SN to become the PSCell. In the step, the UE may determine which cell in the target SN meets the PSCell condition configuration information, take the cell meeting the PSCell condition configuration information as the PSCell, and initiate the random access process to the PSCell. The UE initiates the random access process to the default PSCell if all current cells do not meet the corresponding PSCell condition configuration information.

Embodiment III

In the embodiment, the MN determines the addition condition configuration information of the SN/PSCell, and gives the SN/PSCell configuration information at the same time, and then sends the determined information to the UE.

Figure 6:
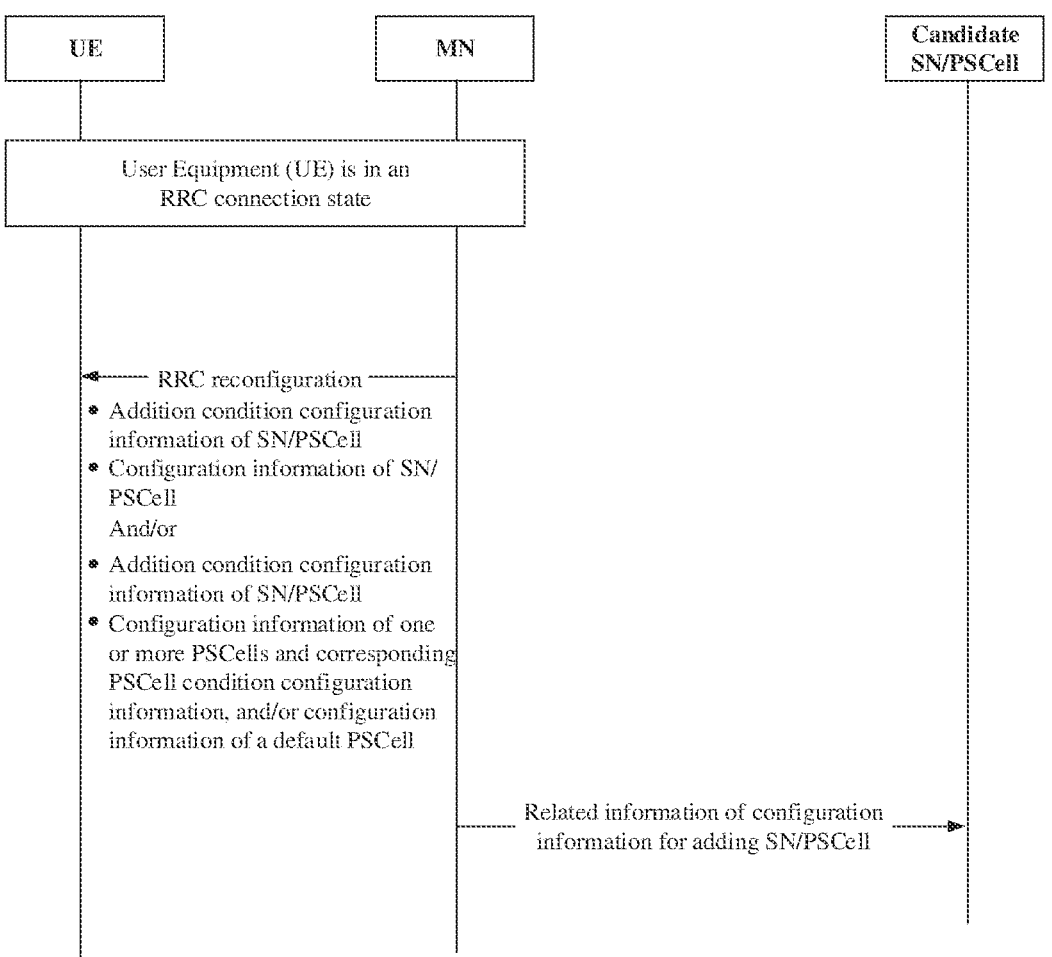
FIG. 6 is an implementation flowchart according to an embodiment III of the application.

FIG. 6 is an implementation flowchart according to an embodiment III of the application. As shown in FIG. 5, the following steps are included.

At S1: An RRC connection is established between the UE and the MN (such as gNB1), and signaling bearer (SRB) and service data bearer (DRB) are established. The UE reports the measurement result of the UE to gNB1.

At S2, gNB1 determines at least one piece of configuration information for adding an SN/PSCell according to the measurement result, including the addition condition configuration information of the SN/PSCell and the configuration information of the SN/PSCell, and sends the above information to the UE. Herein, the addition condition configuration information of the SN/PSCell is separately set for each SN/PSCell, or is set jointly for all the SNs/PSCells.

The configuration information for adding an SN/PSCell may be at least provided with the two forms as follows.

For the first form, the configuration information for adding an SN/PSCell includes at least one of:

addition condition configuration information of the SN/PSCell;

configuration information of the SN/PSCell in the target SN; or configuration information of at least one SCell in the target SN, and/or addition condition configuration information of each SCell.

For the second form, the configuration information for adding an SN/PSCell includes at least one of:

addition condition configuration information of the SN/PSCell;

configuration information of at least one PSCell in the
target SN and the corresponding PSCell condition
configuration information;

configuration information of a default PSCell;

configuration information of at least one SCell in the
target SN, or addition condition configuration information of each SCell.

Herein, the corresponding PSCell condition configuration information may refer to a condition that each Cell in the target SN becomes the PSCell. The default PSCell may refer to the default PSCell in the target SN.

The difference between the above two forms is that in the first form, gNB1 already determines which cell in the target SN is the PSCell for the UE. In the second form, gNB1 configures a condition for each cell in the target SN to become the PSCell (such as the above corresponding PSCell condition configuration information) for the UE, and gives a default PSCell.

At S3, gNB sends information related to the configuration information for adding an SN/PSCell to the corresponding SN/PSCell. This step is used to inform the SN/PSCell that it is possible to establish DC therewith in the future.

At S4, when the UE executes measurement, it is evaluated whether each candidate SN meets the addition condition configuration information of the SN/PSCell and/or SN/PSCell configuration information or not. If so, the UE initiates a random access process to a target SN/PSCell that meets the condition.

Optionally, if gNB1 sends the configuration information of the PSCell in the target SN to the UE in the S2 above, that is, gNB1 already configures the PSCell in the target SN for the UE, the UE may initiate the random access process to the PSCell in this step.

Or, if gNB1 sends the configuration information of one or more PSCells and corresponding PSCell condition configuration information to the UE in the S2 above, that is, gNB1 already informs the UE of the condition for each cell in the target SN to become the PSCell. In the step, the UE may determine which cell in the target SN meets the PSCell condition configuration information, take the cell meeting the PSCell condition configuration information as the PSCell, and initiate the random access process to the PSCell. The UE initiates the random access process to the default PSCell if all current cells do not meet the corresponding PSCell condition configuration information.

The above describes three embodiments of the condition-based method for SN addition or PSCell addition. Herein, in embodiment I, the MN determines the addition condition configuration information of the SN/PSCell, and the SN gives the configuration information of the SN/PSCell according to the addition condition configuration information of the SN/PSCell. In embodiment II, the SN determines the addition condition configuration information of the SN/PSCell, and gives the SN/PSCell configuration information at the same time. In embodiment III, the MN determines the addition condition configuration information of the SN/PSCell, and gives the SN/PSCell configuration information at the same time. The condition-based PSCell addition or SN addition proposed in the embodiment of the present disclosure may reduce air interface signaling, and quickly and timely add PSCell or SN to realize fast load shunting.

According to the above three embodiments, the UE initiates the random access process to the target PSCell. Thereafter, the target SN informs the MN to trigger data forwarding and/or the process of GTP tunnel activation, and/or GTP tunnel establishment.

Optionally, the data forwarding includes MN forwarding data to SN, and/or UPF sending data to SN.

Optionally, the GTP tunnel activation includes GTP tunnel activation from MN to SN, and/or GTP tunnel activation from UPF to SN. The operation of establishing a GTP tunnel includes the SN establishing a GTP tunnel from MN to SN through the MN, and the MN replying the SN to establish the GTP tunnel from the SN to the MN. Through the MN, the SN establishes a GTP tunnel from the UPF to the SN, and the MN informs the UPF of a GTP TEID informed by the SN. The UPF informs the MN about the GTP tunnel from the SN to the UPF, and the MN informs the SN of the GTP TEID allocated by the UPF, which supports the completion of tunnel establishment. The GTP tunnel establishment and GTP tunnel activation processes are respectively introduced in the following embodiments 4 and 5.

Embodiment IV

Figure 7:
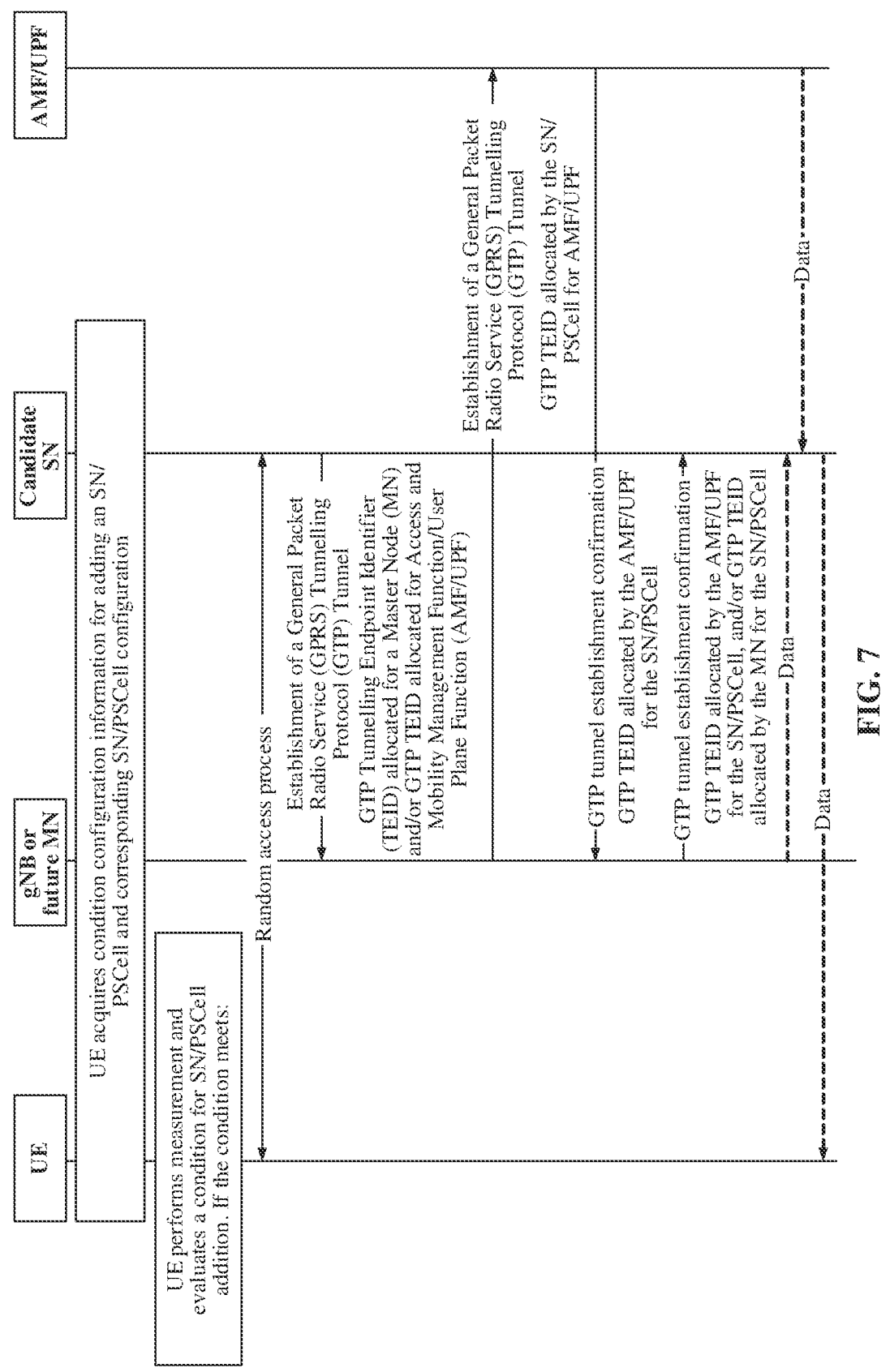
FIG. 7 is an implementation flowchart according to an embodiment IV of the application.

The GTP tunnel establishment process is introduced in this embodiment. FIG. 7 is an implementation flowchart according to an embodiment IV of the application. As shown in FIG. 7, the following steps are included.

At S1, the UE acquires the addition condition configuration information of each candidate SN/PSCell and the configuration information of the SN/PS Cell.

At S2, the UE executes measurement and evaluates the addition condition of the SN/PSCell. If the addition condition of a certain candidate SN/PSCell is met, the random access process is initiated to the SN/PSCell.

At S3, the SN/PSCell accessed by the UE sends a GTP tunnel establishment request to the MN, and the request carries GTP TEID allocated by the SN/PSCell for the MN and/or GTP TEID allocated for the AMF/UPF.

At S4, the Mn sends a GTP tunnel establishment request to the AMF/UPF, and the request carries GTP TEID allocated by the SN/PSCell for the AMF/UPF.

At S5, the AMF/UPF sends a GTP tunnel establishment confirmation message to the MN, and the MN carries GTP TEID allocated by the AMF/UPF for the SN/PS Cell.

At S6, the MN sends a GTP tunnel establishment confirmation message to the SN/PSCell, and the message carries GTP TEID allocated by the AMF/UPF for the SN/PSCell and/or GTP TEID allocated by the Mn for the SN/PS Cell.

The GTP tunnel between the MN and the SN/PSCell and the GTP tunnel between the AMF/UPF and the SN/PSCell are established through the above steps 3 to 6. Thereafter, the MN may forward data to the SN/PSCell using the GTP tunnel with the SN/PSCell, and the AMF/UPF may forward data to the SN/PSCell using the GTP tunnel with the SN/PSCell.

Embodiment V

The GTP tunnel activation process is introduced in this embodiment. In the embodiment, before the process of SN condition configuration, the GTP tunnel between the MN and the SN/PSCell and the GTP tunnel between the AMF/UPF and the SN/PSCell are established in advance.

Figure 8:
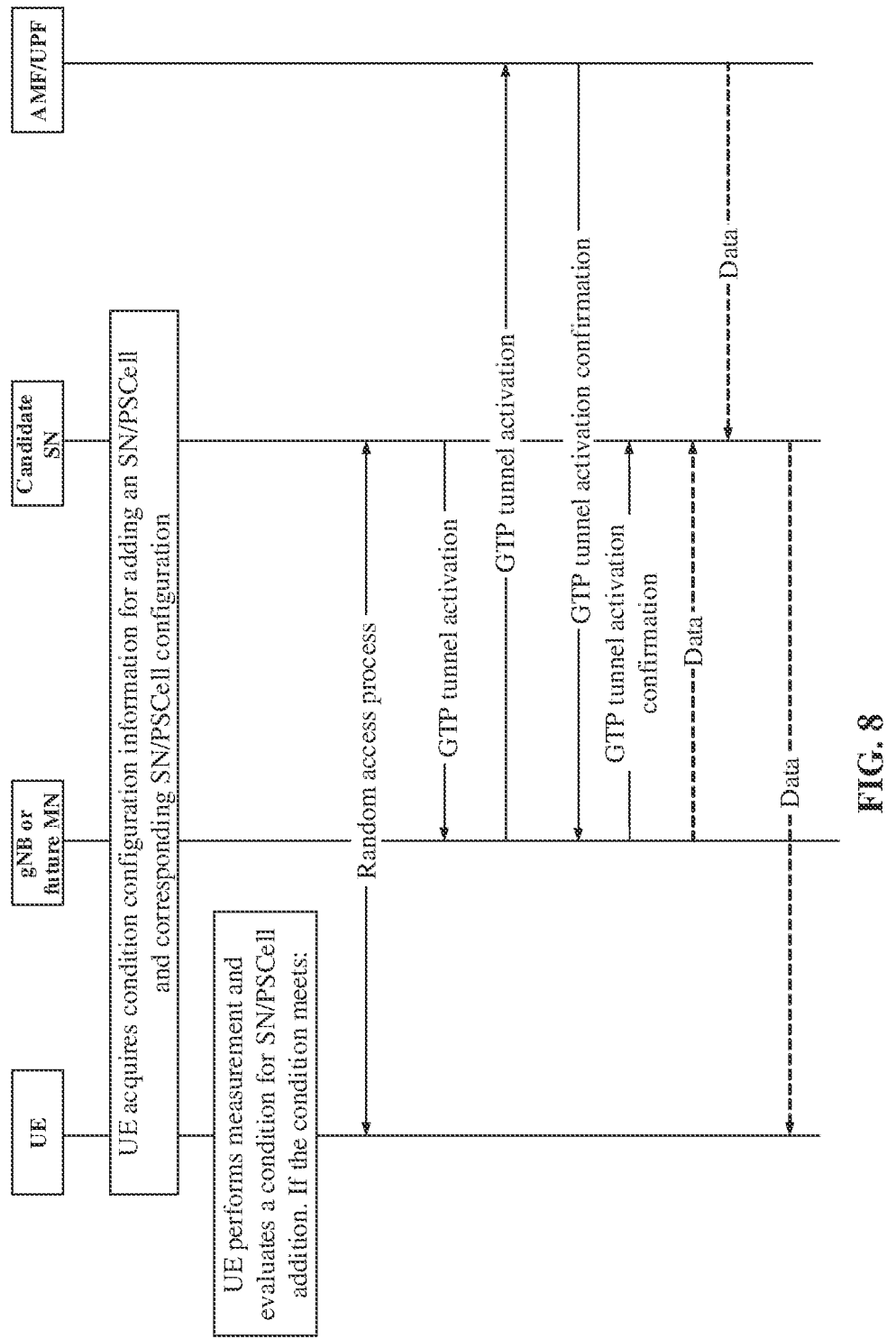
FIG. 8 is an implementation flowchart according to an embodiment V of the application.

FIG. 8 is an implementation flowchart according to an embodiment V of the application. As shown in FIG. 8, the following steps are included.

At S1, the UE acquires the addition condition configuration information of each candidate SN/PSCell and the configuration information of the SN/PS Cell.

At S2, the UE executes measurement and evaluates the addition condition of the SN/PSCell. If the addition condition of a certain candidate SN/PSCell is met, the random access process is initiated to the SN/PSCell.

At S3, the SN/PSCell accessed by the UE sends a GTP tunnel activation request to the MN.

At S4, the MN sends the GTP tunnel activation request to the AMF/UPF.

At S5, the AMF/UPF sends a GTP tunnel activation confirmation message to the MN.

At S6, the MN sends the GTP tunnel activation confirmation message to the SN/PSCell.

The GTP tunnel between the MN and the SN/PSCell and the GTP tunnel between the AMF/UPF and the SN/PSCell established in advance are activated through the above steps 3 to 6. Thereafter, the MN may forward data to the SN/PS-Cell using the GTP tunnel with the SN/PSCell, and the AMF/UPF may forward data to the SN/PSCell using the GTP tunnel with the SN/PSCell.

In the embodiment, the GTP tunnel is already established in the process of SN condition configuration, and when the UE randomly accesses, data forwarding starts only when the GTP tunnel activation is triggered. The establishment of the GTP tunnel in the above embodiment 4 is triggered after random access by the UE, and there is little difference between the two. Only in terms of time delay, the method of this embodiment has a slight gain.

The embodiments further propose a condition-based method for adding an SN or a PSCell. The method may be applied to an MN. FIG. 9 is an implementation flowchart of a condition-based method 900 for adding an SN/PSCell according to an embodiment of the present disclosure, including the following steps.

At S910, configuration information for adding an SN/PS-Cell is sent to a terminal device. The configuration information for adding an SN/PSCell includes at least one of:

addition condition configuration information of the SN/PSCell; or configuration information of the SN/PSCell.

Optionally, the addition condition configuration information of the SN/PSCell includes:

addition condition configuration information configured for each SN/PS Cell; and/or same addition condition configuration information configured for all SNs/PSCells.

The addition condition configuration information of the above SN/PSCell may be determined by the MN according to a measurement result of the UE, and sent to the UE by the MN. Or, the MN sends the measurement result of the UE to each candidate SN, and each candidate SN makes a determination according to the measurement result of the UE, and sends same to the UE through the MN.

Optionally, the configuration information of the SN/PS-Cell includes at least one of:

configuration information of a PSCell in the SN;

configuration information of at least one SCell in the SN; or addition condition configuration information of at least one SCell in the SN.

Or, the configuration information of the SN/PSCell includes at least one of:

configuration information of at least one PSCell in the SN and corresponding PS Cell condition configuration information;

configuration information of a default PSCell;

configuration information of at least one SCell in the SN; or addition condition configuration information of at least one SCell in the SN.

The difference between the above two forms is that in the first form, which cell in the SN is the PSCell is already determined in the configuration information of the SN/PS-Cell. In the second form, the configuration information of the SN/PSCell provides a condition for each cell in the SN to become the PSCell (such as the above corresponding PSCell condition configuration information), and a default PSCell is given. In the subsequent SN/PSCell addition process, upon determining a target SN, the UE may determine whether each cell in the target SN meets the condition of becoming the PSCell, and determine the cell that meets the condition as the PSCell. If each cell does not meet the condition of becoming the PSCell, the above default PSCell is selected as the PSCell for initiating the random access process.

The configuration information of the above SN/PSCell may be determined by the MN according to a measurement result of the UE, and sent to the UE by the MN. Or, the MN sends the measurement result of the UE to each candidate SN, and each candidate SN makes a determination according to the measurement result of the UE, and sends same to the UE through the MN.

In some implementations, the configuration information for adding an SN/PSCell sent by the MN to the UE further includes at least one of:

an SCG counter; or an ID of at least one SN/PSCell.

Optionally, the following operations may further be included before S910.

The measurement result of the terminal device is received, and the measurement result is used to generate the configuration information for adding an SN/PS Cell.

Corresponding to the above embodiment I, the MN may send the addition condition configuration information of the SN/PSCell and the measurement result of the UE to the candidate SN/PSCell, and the candidate SN/PSCell generates the configuration information of the SN/PSCell.

Optionally, the method further includes the following operations.

According to the measurement result of the terminal device, at least one candidate SN/PSCell is determined, and the addition condition configuration information of the SN/PSCell is generated.

At least one as follows is sent to the at least one candidate SN/PSCell:

addition condition configuration information of the SN/PSCell;

the measurement result of the terminal device;

a condition addition instruction of the SN/PSCell, the condition addition instruction being used to inform the candidate SN/PSCell to generate the configuration information of the SN/PSCell according to the measurement result of the terminal device;

an ID of at least one candidate SN/PSCell;

a key of the candidate SN/PSCell; and configuration information of at least one SCell in the SN.

Furthermore, the method may further include the following operations.

The configuration information of the SN/PSCell sent by at least one candidate SN/PSCell is received.

Corresponding to the above embodiment II, the MN may send the measurement result of the UE to the candidate SN/PSCell, and the candidate SN/PSCell generates the addition condition configuration information of the SN/PS-Cell and the configuration information of the SN/PSCell.

Optionally, the method further includes the following operations.

According to the measurement result of the terminal device, at least one candidate SN/PSCell is determined.

At least one as follows is sent to the at least one candidate SN/PSCell:

the measurement result of the terminal device; and a configuration information instruction, the configuration information instruction being used to inform the candidate SN/PSCell to generate the configuration information for adding an SN/PSCell according to the measurement result of the terminal device.

In an implementation mode, the method further includes the following operations.

The configuration information for adding the SN/PSCell sent by at least one candidate SN/PSCell is received.

The configuration information for adding an SN/PSCell includes at least one of:

addition condition configuration information of the SN/PSCell;

configuration information of a PSCell in the SN;

configuration information of at least one SCell in the SN; or addition condition configuration information of at least one SCell in the SN.

Or, in another implementation mode, the method further includes the following operations.

The configuration information for adding an SN/PSCell sent by at least one candidate SN/PSCell is received.

The configuration information for adding an SN/PSCell includes at least one of:

addition condition configuration information of the SN/PSCell;

configuration information of at least one PSCell in the SN and corresponding PS Cell condition configuration information;

configuration information of a default PS Cell;

configuration information of at least one SCell in the SN; or addition condition configuration information of at least one SCell in the SN.

In some implementations, the MN also sends the key of the SN/PSCell to the at least one candidate SN/PSCell.

Corresponding to the above embodiment III, the method may further include that: the configuration information for adding an SN/PSCell is determined according to the measurement result of the terminal device.

Optionally, the method may further include that: the MN sends information related to the configuration information for adding an SN/PSCell to the corresponding SN/PSCell.

Optionally, the addition condition configuration information of the node/PS Cell is at least provided with a plurality of cases as follows.

When the MN is an NR base station, if the SN is an LTE base station, the addition condition configuration information of the SN/PSCell is based on a B1 event.

When the MN is an NR base station, if the SN is an NR base station, the addition condition configuration information of the SN/PSCell is based on an A4 event.

When the MN is an LTE base station, if the SN is an LTE base station, the addition condition configuration information of the SN/PSCell is based on an A4 event.

When the MN is an LTE base station, if the SN is an NR base station, the addition condition configuration information of the SN/PSCell is based on a B1 event.

Optionally, the addition condition configuration information of the node/PSCell may be related to an entity that configures the information.

For example, if the addition condition configuration information of the SN/PSCell is configured by the SN, the addition condition configuration information of the SN/PSCell is based on A3 and B5 events.

If the addition condition configuration information of the SN/PSCell is configured by the MN, the addition condition configuration information of the SN/PSCell is based on a B1 event.

In some implementations, the method may further include the following operations.

A first radio service tunnel protocol GTP tunnel establishment request sent by an SN is received, and the first GTP tunnel establishment request includes GTP tunnel IDs allocated by the SN to the MN and AMF/UPF.

A second GTP tunnel establishment request is sent to the AMF/UPF, and the second GTP tunnel establishment request includes the GTP tunnel ID allocated by the SN to the AMF/UPF.

A second GTP tunnel establishment confirmation message sent by the AMF/UPF is received, and the second GTP tunnel establishment confirmation message includes the GTP tunnel ID allocated by the AMF/UPF to the SN.

A first GTP tunnel establishment confirmation message is sent to the SN, and the first GTP tunnel establishment confirmation message includes the GTP tunnel ID allocated by the MN to the AMF/UPF and the GTP tunnel ID allocated by the AMF/UPF to the SN.

In some implementations, the method may further include the following operations.

A first GTP tunnel activation request sent by an SN is received.

A second GTP tunnel activation request is sent to the AMF/UPF.

A second GTP tunnel activation confirmation message sent by the AMF/UPF is received.

A first GTP tunnel activation confirmation message is sent to the SN.

The GTP tunnel between the MN and the SN/PSCell and the GTP tunnel between the AMF/UPF and the SN/PSCell are established or activated through the above process. Using the GTP tunnel, optionally, the method further includes that: the MN forwards data to the SN.

The embodiments further propose a condition-based method for adding an SN or a PSCell. The method may be applied to an SN. FIG. 10 is an implementation flowchart of a condition-based method 1000 for adding an SN/PSCell according to an embodiment of the present disclosure, including the following steps.

At S1010, configuration information for adding an SN/PSCell is sent to an MN. The configuration information for adding an SN/PSCell may include at least one of:

addition condition configuration information of the SN/PSCell; or configuration information of the SN/PSCell.

Optionally, the addition condition configuration information of the SN/PSCell includes:

addition condition configuration information configured for each SN/PS Cell; and/or same addition condition configuration information configured for all SNs/PS Cells.

In some implementations, the configuration information of the SN/PSCell includes at least one of:

configuration information of a PSCell in the SN;

configuration information of at least one SCell in the SN; or addition condition configuration information of at least one SCell in the SN.

Or, in some implementations, the configuration information of the SN/PSCell includes at least one of:

configuration information of at least one PSCell in the SN and corresponding PSCell condition configuration information;

configuration information of a default PSCell;

configuration information of at least one SCell in the SN; or addition condition configuration information of at least one SCell in the SN.

Corresponding to the above embodiment I, optionally, the following operations are further included before sending.

Information sent by the MN is received, and the configuration information of the SN/PSCell is determined according to the information sent by the MN. Herein, the information sent by the MN includes at least one of:

addition condition configuration information of the SN/PSCell;

the measurement result of the terminal device;

a condition addition instruction of the SN/PSCell, the condition addition instruction being used to inform the SN to generate the configuration information of the SN/PSCell according to the measurement result of the terminal device;

an ID of at least one candidate SN/PSCell;

a key of the SN/PSCell; or configuration information of at least one SCell in the SN.

Corresponding to the above embodiment II, optionally, the following operations are further included before sending.

Information sent by the MN is received, and the configuration information for adding an SN/PSCell is determined according to the information sent by the MN. Herein, the information sent by the MN includes at least one of:

the measurement result of the terminal device; or a configuration information instruction, the configuration information instruction being used to inform the SN to generate the configuration information for adding an SN/PSCell according to the measurement result of the terminal device.

In some implementations, the information sent by the MN further includes:

a key of the SN/PSCell.

Optionally, the addition condition configuration information of the node/PSCell is at least provided with a plurality of cases as follows.

When the MN is an NR base station, if the SN is an LTE base station, the addition condition configuration information of the SN/PSCell is based on a B1 event.

When the MN is an NR base station, if the SN is an NR base station, the addition condition configuration information of the SN/PSCell is based on an A4 event.

When the MN is an LTE base station, if the SN is an LTE base station, the addition condition configuration information of the SN/PSCell is based on an A4 event.

When the MN is an LTE base station, if the SN is an NR base station, the addition condition configuration information of the SN/PSCell is based on a B1 event.

Optionally, the addition condition configuration information of the node/PSCell may be related to an entity that configures the information.

For example, if the addition condition configuration information of the SN/PSCell is configured by the SN, the addition condition configuration information of the SN/PS-Cell is based on A3 and B5 events.

If the addition condition configuration information of the SN/PSCell is configured by the MN, the addition condition configuration information of the SN/PSCell is based on a B1 event.

In some implementations, the method may further include the following operations.

A first GTP tunnel establishment request is sent to the MN, and the first GTP tunnel establishment request includes GTP tunnel IDs allocated by the SN to the MN and AMF/UPF.

A first GTP tunnel establishment confirmation message sent by the MN is received, and the first GTP tunnel establishment confirmation message includes the GTP tunnel ID allocated by the MN to the AMF/UPF and the GTP tunnel ID allocated by the AMF/UPF to the SN.

In some implementations, the method may further include the following operations.

A first GTP tunnel activation request is sent to an MN.

A first GTP tunnel activation confirmation message sent by the MN is received.

The GTP tunnel between the MN and the SN/PSCell and the GTP tunnel between the AMF/UPF and the SN/PSCell are established through the above process. Using the GTP tunnel, optionally, the method further includes that: the SN receives the data forwarded by the MN, and/or receives the data forwarded by the AMF/UPF.

The embodiments of the present disclosure further propose a terminal device. FIG. 11 is a structural schematic diagram of a terminal device 1100 according to an embodiment of the present disclosure, including a first receiving module 1110 and an adding module 1120.

The first receiving module 1110 is configured to receive configuration information for adding an SN/PSCell.

The adding module 1120 is configured to add the SN/PS-Cell using the configuration information for adding an SN/PSCell.

The configuration information for adding an SN/PSCell includes at least one of:

addition condition configuration information of the SN/PSCell; or configuration information of the SN/PSCell.

Optionally, the addition condition configuration information of the SN/PSCell includes:

addition condition configuration information configured for each SN/PSCell; and/or same addition condition configuration information configured for all SNs/PSCells.

Optionally, the configuration information of the SN/PS-Cell includes at least one of:

configuration information of a PSCell in the SN;

configuration information of at least one SCell in the SN; or addition condition configuration information of at least one SCell in the SN.

Optionally, the configuration information of the SN/PS-Cell includes at least one of:

configuration information of at least one PSCell in the SN and corresponding PSCell condition configuration information;

configuration information of a default PSCell;

configuration information of at least one SCell in the SN; or addition condition configuration information of at least one SCell in the SN.

Figure 12:
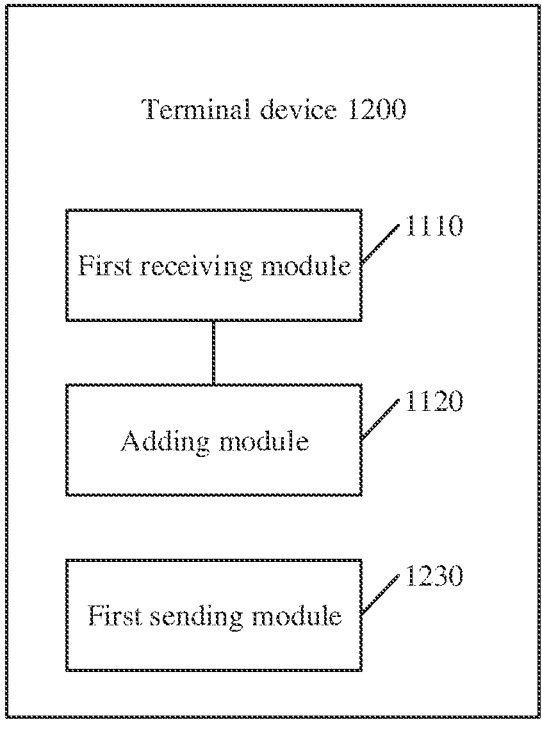
FIG. 12 is a structural schematic diagram of a terminal device 1200 according to an embodiment of the present disclosure.

As shown in FIG. 12, the terminal device further includes: a first sending module 1230.

The first sending module 1230 is configured to send the measurement result of the terminal device to an MN, and the measurement result is used to generate the configuration information for adding an SN/PSCell.

Optionally, when the MN is a new radio access NR base station, if the SN is an LTE base station, the addition condition configuration information of the SN/PSCell is based on a B1 event.

When the MN is an NR base station, if the SN is an NR base station, the addition condition configuration information of the SN/PSCell is based on an A4 event.

When the MN is an LTE base station, if the SN is an LTE base station, the addition condition configuration information of the SN/PSCell is based on an A4 event.

When the MN is an LTE base station, if the SN is an NR base station, the addition condition configuration information of the SN/PSCell is based on a B1 event.

Optionally, if the addition condition configuration information of the SN/PSCell is configured by the SN, the addition condition configuration information of the SN/PS-Cell is based on A3 and B5 events.

If the addition condition configuration information of the SN/PSCell is configured by the MN, the addition condition configuration information of the SN/PSCell is based on a B1 event.

Optionally, the adding module 1120 is configured to perform the following operations.

It is judged whether current condition meets the addition condition configuration information of the SN/PSCell, and when the current condition meets the addition condition configuration information of the SN/PSCell, a random access process is initiated to the SN/PSCell corresponding to the addition condition configuration information of the SN/PSCell.

Optionally, the configuration information for adding an SN/PSCell further includes at least one of:

an SCG counter; or an ID of at least one SN/PSCell.

It is to be understood that the above-mentioned and other operations and/or functions of the modules in the terminal device according to the embodiment of the present disclosure are respectively to realize the corresponding flow of the terminal device in the method 300 of FIG. 3, so elaborations are omitted here for brevity.

Figure 13:
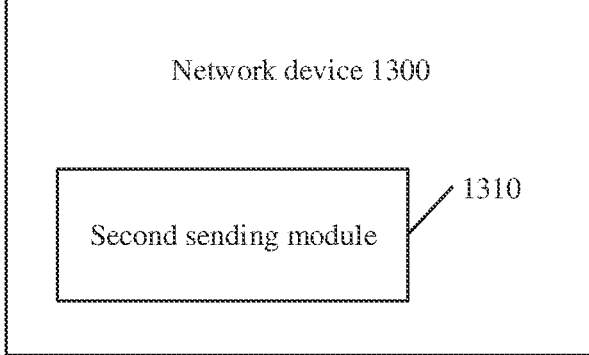
FIG. 13 is a structural schematic diagram of a network device 1300 according to an embodiment of the present disclosure.

The embodiments of the present disclosure further propose a network device. FIG. 13 is a structural schematic diagram of a network device 1300 according to an embodiment of the present disclosure, including a second sending module 1310.

The second sending module 1310 is configured to send configuration information for adding an SN/PSCell to a terminal device. The configuration information for adding an SN/PSCell include at least one of:

addition condition configuration information of the SN/PSCell; or configuration information of the SN/PSCell.

Optionally, the addition condition configuration information of the SN/PSCell includes:

addition condition configuration information configured for each SN/PS Cell; and/or same addition condition configuration information configured for all SNs/PSCells.

Optionally, the configuration information of the SN/PS-Cell includes at least one of:

configuration information of a PSCell in the SN;

configuration information of at least one SCell in the SN; or addition condition configuration information of at least one SCell in the SN.

Optionally, the configuration information of the SN/PS-Cell includes at least one of:

configuration information of at least one PSCell in the SN and corresponding PSCell condition configuration information;

configuration information of a default PSCell;

configuration information of at least one SCell in the SN; or addition condition configuration information of at least one SCell in the SN.

Optionally, the configuration information for adding an SN/PSCell further includes at least one of:

an SCG counter; or an ID of at least one SN/PSCell.

Figure 14:
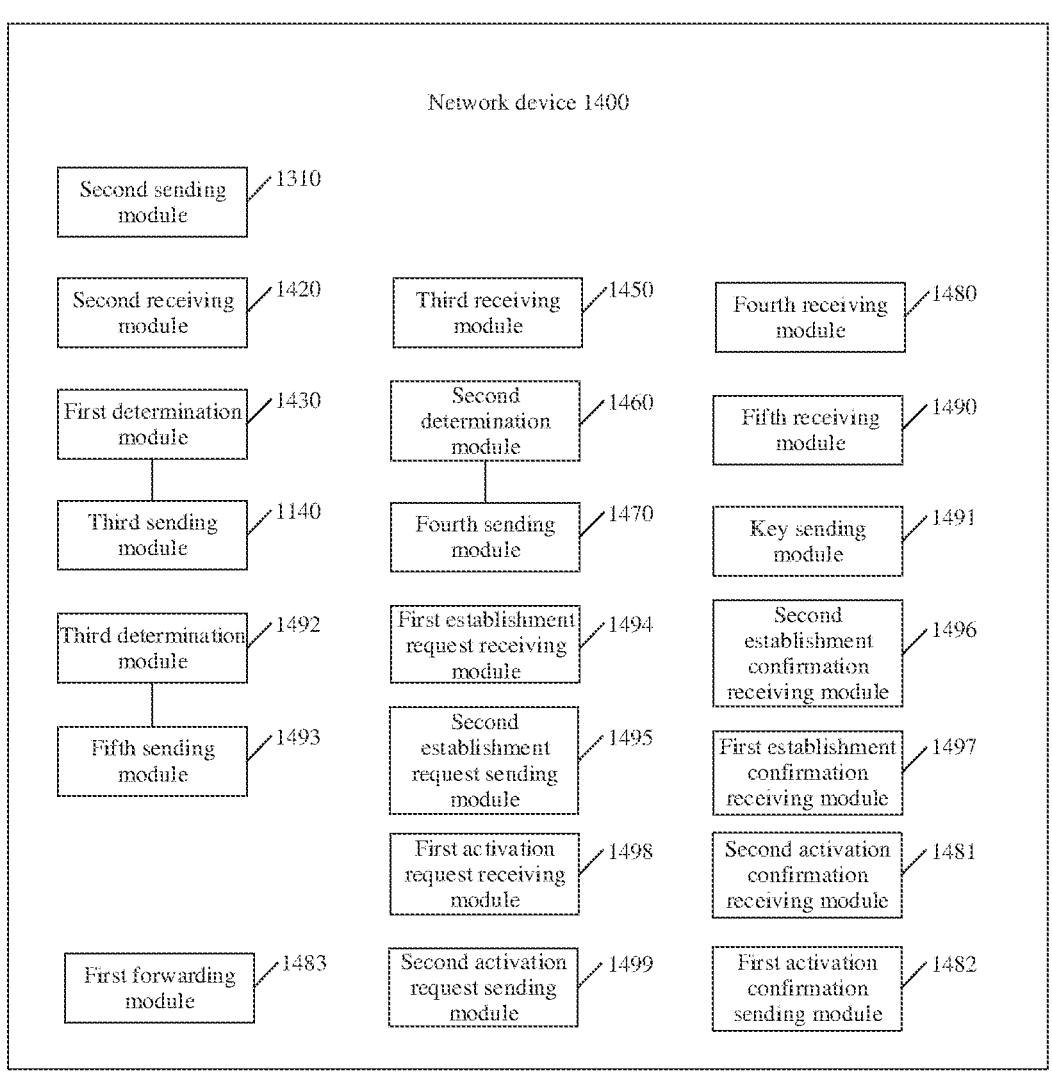
FIG. 14 is a structural schematic diagram of a network device 1400 according to an embodiment of the present disclosure.

As shown in FIG. 14, the network device further includes: a second receiving module 1420.

The second receiving module 1420 is configured to receive the measurement result of the terminal device, and the measurement result is used to generate the configuration information for adding an SN/PSCell.

Optionally, a first determination module 1430 and a third sending module 1440 are further included.

The first determination module 1430 is configured to determine, according to the measurement result of the terminal device, at least one candidate SN/PSCell, and generate the addition condition configuration information of the SN/PS Cell.

The third sending module 1440 is configured to send at least one as follows to the at least one candidate SN/PSCell:

addition condition configuration information of the SN/PSCell;

the measurement result of the terminal device;

a condition addition instruction of the SN/PSCell, the condition addition instruction being used to inform the candidate SN/PSCell to generate the configuration information of the SN/PSCell according to the measurement result of the terminal device;

an ID of at least one candidate SN/PSCell;

a key of the candidate SN/PSCell; and configuration information of at least one SCell in the SN.

Optionally, the third receiving module 1450 is configured to receive the configuration information of the SN/PSCell sent by the at least one candidate SN/PS Cell.

Optionally, a second determination module 1460 and a fourth sending module 1470 are further included.

The second determination module 1460 is configured to determine, according to the measurement result of the terminal device, at least one candidate SN/PS Cell.

The fourth sending module 1470 is configured to send at least one as follows to the at least one candidate SN/PSCell:

the measurement result of the terminal device; and a configuration information instruction, the configuration information instruction being used to inform the candidate SN/PSCell to generate the configuration information for adding an SN/PSCell according to the measurement result of the terminal device.

Optionally, a fourth receiving module 1480 is further included.

The fourth receiving module 1480 is configured to receive the configuration information for adding an SN/PSCell sent by the at least one candidate SN/PS Cell.

The configuration information for adding an SN/PSCell includes at least one of:

addition condition configuration information of the SN/PSCell;

configuration information of a PSCell in the SN;

configuration information of at least one SCell in the SN; or addition condition configuration information of at least one SCell in the SN.

Optionally, a fifth receiving module 1490 is further included.

The fifth receiving module 1490 is configured to receive the configuration information for adding an SN/PSCell sent by the at least one candidate SN/PS Cell.

The configuration information for adding an SN/PSCell includes at least one of:

addition condition configuration information of the SN/PSCell;

configuration information of at least one PSCell in the SN and corresponding PS Cell condition configuration information;

configuration information of a default PS Cell;

configuration information of at least one SCell in the SN; or addition condition configuration information of at least one SCell in the SN.

Optionally, a key sending module 1491 is further included.

The key sending module 1491 is configured to send a key of the SN/PSCell to the at least one candidate SN/PSCell.

Optionally, a third determination module 1492 is further included.

The third determination module 1492 is configured to determine, according to the measurement result of the terminal device, the configuration information for adding an SN/PSCell.

Optionally, a fifth sending module 1493 is further included.

The fifth sending module 1493 is configured to send information related to the configuration information for adding an SN/PSCell to the corresponding SN/PS Cell.

Optionally, when the MN is an NR base station, if the SN is an LTE base station, the addition condition configuration information of the SN/PSCell is based on a B1 event.

When the MN is an NR base station, if the SN is an NR base station, the addition condition configuration information of the SN/PSCell is based on an A4 event.

When the MN is an LTE base station, if the SN is an LTE base station, the addition condition configuration information of the SN/PSCell is based on an A4 event.

When the MN is an LTE base station, if the SN is an NR base station, the addition condition configuration information of the SN/PSCell is based on a B1 event.

Optionally, if the addition condition configuration information of the SN/PSCell is configured by the SN, the addition condition configuration information of the SN/PSCell is based on A3 and B5 events.

If the addition condition configuration information of the SN/PSCell is configured by the MN, the addition condition configuration information of the SN/PSCell is based on a B1 event.

Optionally, a first establishment request receiving module 1494, a second establishment request sending module 1495, a second establishment confirmation receiving module 1496, and a first establishment confirmation receiving module 1497 are further included.

The first establishment request receiving module 1494 is configured to receive a first radio service tunnel protocol GTP tunnel establishment request sent by an SN, and the first GTP tunnel establishment request includes GTP tunnel IDs allocated by the SN to the MN and AMF/UPF.

The second establishment request receiving module 1495 is configured to send a second GTP tunnel establishment request to the AMF/UPF, and the second GTP tunnel establishment request includes the GTP tunnel ID allocated by the SN to the AMF/UPF.

The second establishment confirmation receiving module 1496 is configured to receive a second GTP tunnel establishment confirmation message sent by the AMF/UPF, and the second GTP tunnel establishment confirmation message includes the GTP tunnel ID allocated by the AMF/UPF to the SN.

The first establishment confirmation receiving module 1497 is configured to send a first GTP tunnel establishment confirmation message to the SN, and the first GTP tunnel establishment confirmation message includes the GTP tunnel ID allocated by the MN to the AMF/UPF and the GTP tunnel ID allocated by the AMF/UPF to the SN.

Optionally, a first activation request receiving module 1498, a second activation request sending module 1499, a second activation confirmation receiving module 1481 and a first activation confirmation sending module 1482 are further included.

The first activation request receiving module 1498 is configured to receive a first GTP tunnel activation request sent by an SN.

The second activation request sending module 1499 is configured to send a second GTP tunnel activation request to the AMF/UPF.

The second activation confirmation receiving module 1481 is configured to receive a second GTP tunnel activation confirmation message sent by the AMF/UPF.

The first activation confirmation sending module 1482 is configured to send a first GTP tunnel activation confirmation message to the SN.

Optionally, a first forwarding module 1483, configured to forward data to the SN is further included.

It is to be understood that the above-mentioned and other operations and/or functions of the modules in the network device according to the embodiment of the present disclosure are respectively to realize the corresponding flow of the network device in the method 900 of FIG. 9, so elaborations are omitted here for brevity.

Figure 15:
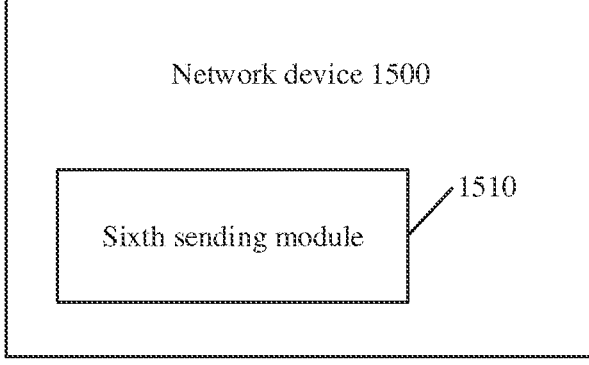
FIG. 15 is a structural schematic diagram of a network device 1500 according to an embodiment of the present disclosure.

The embodiments of the present disclosure further propose a network device. FIG. 15 is a structural schematic diagram of a network device 1500 according to an embodiment of the present disclosure, including: a sixth sending module 1510.

The sixth sending module 1510 is configured to send configuration information for adding an SN/PSCell to an MN. The configuration information for adding an SN/PSCell includes at least one of:

addition condition configuration information of the SN/PSCell; or configuration information of the SN/PSCell.

Optionally, the addition condition configuration information of the SN/PSCell includes:

addition condition configuration information configured for each SN/PSCell; and/or same addition condition configuration information configured for all SNs/PSCells.

Optionally, the configuration information of the SN/PSCell includes at least one of:

configuration information of a PSCell in the SN;

configuration information of at least one SCell in the SN; or addition condition configuration information of at least one SCell in the SN.

Optionally, the configuration information of the SN/PS-Cell includes at least one of:

configuration information of at least one PSCell in the SN and corresponding PSCell condition configuration information;

configuration information of a default PSCell;

configuration information of at least one SCell in the SN; or addition condition configuration information of at least one SCell in the SN.

Figure 16:
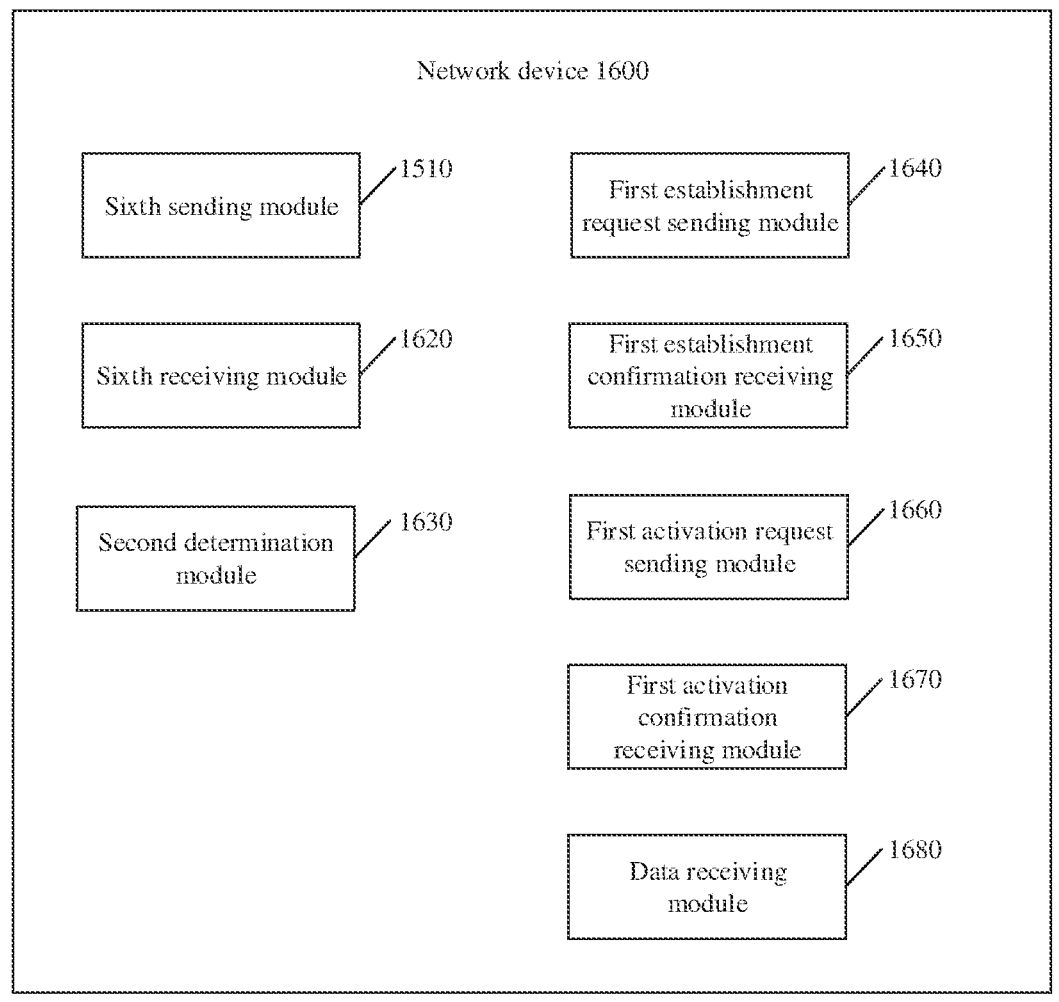
FIG. 16 is a structural schematic diagram of a network device 1600 according to an embodiment of the present disclosure.

Optionally, as shown in FIG. 16, the network device further includes: a sixth receiving module 1620.

The sixth receiving module 1620 is configured to receive information sent by the MN, and determine the configuration information of the SN/PSCell according to the information sent by the MN. Herein, the information sent by the MN includes at least one of:

addition condition configuration information of the SN/PSCell;

the measurement result of the terminal device;

a condition addition instruction of the SN/PSCell, the condition addition instruction being used to inform the SN to generate the configuration information of the SN/PSCell according to the measurement result of the terminal device;

an ID of at least one candidate SN/PSCell;

a key of the SN/PSCell; or configuration information of at least one SCell in the SN.

Optionally, a second determination module 1630 is further included.

The second determination module 1630 is configured to receive information sent by the MN, and determine the configuration information for adding the SN/PSCell according to the information sent by the MN. Herein, the information sent by the MN includes at least one of:

the measurement result of the terminal device; or a configuration information instruction, the configuration information instruction being used to inform the SN to generate the configuration information for adding an SN/PSCell according to the measurement result of the terminal device.

Optionally, the information sent by the MN further includes:

a key of the SN/PSCell.

Optionally, when the MN is an NR base station, if the SN is an LTE base station, the addition condition configuration information of the SN/PSCell is based on a B1 event.

When the MN is an NR base station, if the SN is an NR base station, the addition condition configuration information of the SN/PSCell is based on an A4 event.

When the MN is an LTE base station, if the SN is an LTE base station, the addition condition configuration information of the SN/PSCell is based on an A4 event.

When the MN is an LTE base station, if the SN is an NR base station, the addition condition configuration information of the SN/PSCell is based on a B1 event.

Optionally, if the addition condition configuration information of the SN/PSCell is configured by the SN, the addition condition configuration information of the SN/PS-Cell is based on A3 and B5 events.

If the addition condition configuration information of the SN/PSCell is configured by the MN, the addition condition configuration information of the SN/PSCell is based on a B1 event.

Optionally, a first establishment request sending module 1640 and a first establishment confirmation receiving module 1650 are further included.

The first establishment request sending module 1640 is configured to send a first GTP tunnel establishment request to an MN, and the first GTP tunnel establishment request includes GTP tunnel IDs allocated by the SN to the MN and AMF/UPF.

The first establishment confirmation receiving module 1650 is configured to receive a first GTP tunnel establishment confirmation message sent by the MN, and the first GTP tunnel establishment confirmation message includes the GTP tunnel ID allocated by the MN to the AMF/UPF and the GTP tunnel ID allocated by the AMF/UPF to the SN.

Optionally, a first activation request sending module 1660 and a first activation confirmation receiving module 1670 are further included.

The first activation request sending module 1660 is configured to send a first GTP tunnel activation request to the MN.

The first activation confirmation receiving module 1670 is configured to receive a first GTP tunnel activation confirmation message sent by the MN.

Optionally, a data receiving module 1680 is further included.

The data receiving module 1680 is configured to receive the data forwarded by the MN, and/or receive the data forwarded by the AMF/UPF.

It is to be understood that the above-mentioned and other operations and/or functions of the modules in the network device according to the embodiment of the present disclosure are respectively to realize the corresponding flow of the network device in the method 1000 of FIG. 10, so elaborations are omitted here for brevity.

Figure 17:
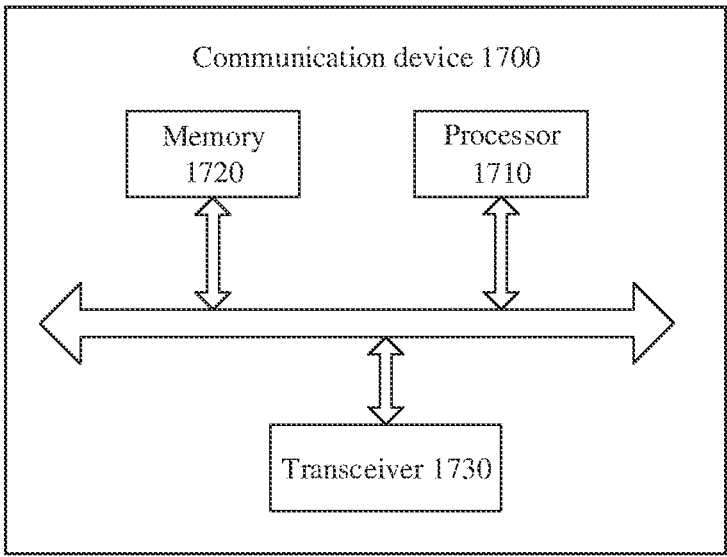
FIG. 17 is a schematic structural diagram of a communication device 1700 according to an embodiment of the present disclosure.

FIG. 17 is a schematic structural diagram of a communication device 1700 according to an embodiment of the present disclosure. The communication device 1700 as shown in FIG. 17 includes a processor 1710, and the processor 1710 may call and run a computer program from a memory to implement the method in the embodiment of the present disclosure.

Optionally, as shown in FIG. 17, the communication device 1700 may also include a memory 1720. Herein, the processor 1710 may call and run a computer program from the memory 1720 to implement the method in the embodiment of the present disclosure.

Herein, the memory 1720 may be a separate device independent of the processor 1710 or integrated in the processor 1710.

Optionally, as shown in FIG. 17, the communication device 1700 may also include a transceiver 1730, and the processor 1710 may control the transceiver 1730 to communicate with other devices. Specifically, same may send information or data to or receive information or data sent by other devices.

Herein, the transceiver 1730 may include a transmitter and a receiver. The transceiver 1730 may further include an antenna, and the number of antennas may be one or more.

Optionally, the communication device 1700 may be the terminal device of the embodiments of the present disclosure. The communication device 1700 may implement corresponding flows implemented by the terminal device in each method of the embodiments of the present disclosure. For brevity, elaborations are omitted herein.

Optionally, the communication device 1700 may be the network device of the embodiments of the present disclosure. The communication device 1700 may implement corresponding flows implemented by the network device in each method of the embodiments of the present disclosure. For brevity, elaborations are omitted herein.

Figure 18:
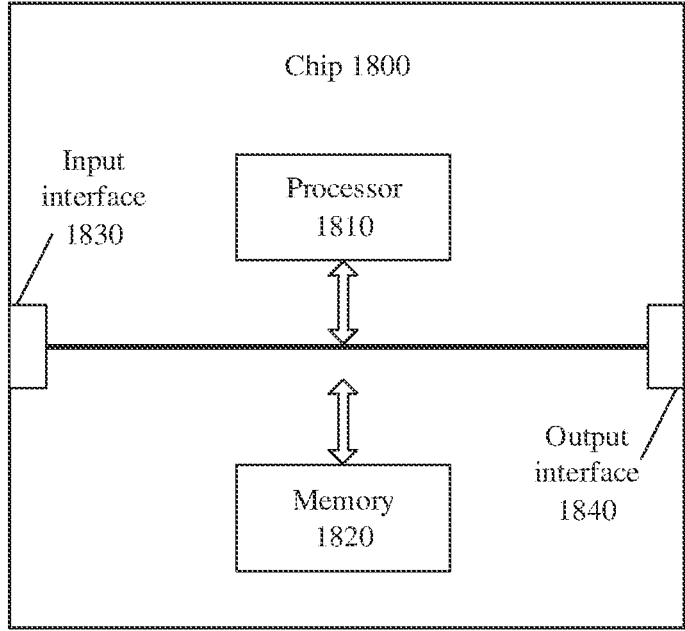
FIG. 18 is a structural schematic diagram of a chip 1800 according to an embodiment of the present disclosure.

FIG. 18 is a structural schematic diagram of a chip 1800 according to an embodiment of the present disclosure. As shown in FIG. 18, the chip includes a processor 1810, and the processor 1810 may call and run a computer program from a memory to implement the method in the embodiment of the present disclosure.

Optionally, as shown in FIG. 18, the chip 1800 may also include a memory 1820. The processor 1810 may call and run the computer program from the memory 1820 to implement the method in the embodiment of the present application.

The memory 1820 may be a separate device independent of the processor 1810 or integrated in the processor 1810.

Optionally, the chip 1800 may also include an input interface 1830. The processor 1810 may control the input interface 1830 to communicate with other devices or chips, and specifically, may acquire information or data sent by other devices or chips.

Optionally, the chip 1800 may also include an output interface 1840. The processor 1810 may control the output interface 1840 to communicate with other devices or chips, and specifically, may output information or data to other devices or chips.

Optionally, the chip may be applied to the terminal device of the embodiments of the present disclosure. The chip may implement corresponding flows implemented by the terminal device in each method of the embodiments of the present disclosure. For brevity, elaborations are omitted herein.

Optionally, the chip may be applied to the network device of the embodiments of the present disclosure. The chip may implement corresponding flows implemented by the network device in each method of the embodiments of the present disclosure. For brevity, elaborations are omitted herein.

It is to be understood that the chip mentioned in the embodiment of the disclosure may also be called a system-level chip, a system chip, a chip system, a system on chip, or the like.

The processor mentioned above may be a general-purpose processor, a Digital Signal Processor (DSP), a Field Programmable Gate Array (FPGA), an Application Specific Integrated Circuit (ASIC), or another programmable logical device, transistor logical device, discrete hardware component, etc. The general-purpose processor mentioned above may be a microprocessor, or any conventional processor, etc.

The memory mentioned above may be a volatile memory or a nonvolatile memory, or may include both volatile and nonvolatile memories. Herein, the nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). That is, the memory in the embodiments of the disclosure is intended to include, but not limited to, memories of these and any other proper types.

The embodiments of the present disclosure can realize the condition-based SN addition or PSCell addition, so that the addition process of the SN or PSCell can be completed in time and effectively, and effective load shunting is realized.

The embodiments may be implemented completely or partially through software, hardware, firmware or any combination thereof. During implementation with the software, the embodiments may be implemented completely or partially in form of a computer program product. The computer program product includes one or more computer instructions. When the computer program instruction is loaded and executed on a computer, the flows or functions according to the embodiments of the present disclosure are completely or partially generated. The computer may be a universal computer, a dedicated computer, a computer network, or another programmable device. The computer instruction may be stored in a computer-readable storage medium or transmitted from a computer-readable storage medium to another computer-readable storage medium. For example, the computer instruction may be transmitted from a website, computer, server, or data center to another website, computer, server, or data center in a wired (such as coaxial cable, optical fiber, and Digital Subscriber Line (DSL)) or wireless (such as infrared, radio, and microwave) manner. The computer-readable storage medium may be any available medium accessible for the computer or a data storage device integrated with one or more available media, such as a server and a data center. The available medium may be a magnetic medium (for example, a floppy disk, a hard disk and a magnetic tape), an optical medium (for example, a Digital Versatile Disc (DVD)), a semiconductor medium (for example, a Solid State Disk (SSD)) or the like.

It is further to be understood that the sequence numbers of the foregoing processes do not mean execution sequences in various embodiments of the present application. The execution sequences of the processes should be determined according to functions and internal logics of the processes, and should not be construed as any limitation to the implementation processes of the embodiments of the present application.

Those skilled in the art may clearly learn about that specific working processes of the system, device, and unit described above may refer to the corresponding processes in the method embodiment and will not be elaborated herein for ease and briefness of description.

The above is only the specific implementation mode of the present application and not intended to limit the scope of protection of the present application. Any variations or replacements apparent to those skilled in the art within the technical scope disclosed by the present application shall fall within the scope of protection of the present application. Therefore, the scope of protection of the present application shall be subjected to the scope of protection of the claims.

The invention claimed is:

1. A condition-based method for adding a Secondary Node (SN) or a Primary Secondary Cell (PSCell), applied to a terminal device, comprising:

receiving configuration information for adding an SN/PSCell; and adding the SN/PSCell by using the configuration information for adding an SN/PSCell, wherein the configuration information for adding an SN/PSCell comprises at least one of: addition condition configuration information of the SN/PSCell, wherein the addition condition configuration information of the SN/PSCell comprises a plurality pieces of addition condition configuration information configured for a plurality of SNs/PSCells respectively, each of the plurality of pieces of the addition condition configuration information is determined by a corresponding one of the plurality of SNs; or configuration information of the SN/PSCell, wherein the configuration information of the SN/PSCell comprises configuration information of a default PSCell;

when a master node (MN) is a New Radio (NR) base station, if the SN is a Long Term Evolution (LTE) base station, the addition condition configuration information of the SN/PSCell is based on a B1 event, when the MN is an NR base station, if the SN is an NR base station, the addition condition configuration information of the SN/PSCell is based on an A4 event, when the MN is an LTE base station, if the SN is an LTE base station, the addition condition configuration information of the SN/PSCell is based on an A4 event, and when the MN is an LTE base station, if the SN is an NR base station, the addition condition configuration information of the SN/PSCell is based on a B1 event.

2. The method of claim 1, wherein the addition condition configuration information of the SN/PSCell further comprises:

same addition condition configuration information configured for all SNs/PSCells.

3. The method of claim 1, wherein the configuration information of the SN/PSCell further comprises at least one of:

configuration information of at least one PSCell in the SN and corresponding PSCell condition configuration information; or configuration information of at least one SCell in the SN.

4. The method of claim 1, wherein before receiving the configuration information for adding an SN/PSCell, the method further comprises:

sending a measurement result of the terminal device to a Master Node (MN), the measurement result being used to generate the configuration information for adding an SN/PSCell.

5. The method of claim 1, wherein if the addition condition configuration information of the SN/PSCell is configured by the SN, the addition condition configuration information of the SN/PSCell is based on A3 and B5 events, if the addition condition configuration information of the SN/PSCell is configured by the MN, the addition condition configuration information of the SN/PSCell is based on a B1 event.

6. The method of claim 1, wherein adding the SN/PSCell by using the configuration information for adding an SN/PSCell comprises:

determining whether current condition meets the addition condition configuration information of the SN/PSCell, and initiating, when the current condition meets the addition condition configuration information of the SN/PSCell, a random access process to an SN/PSCell corresponding to the addition condition configuration information of the SN/PSCell.

7. The method of claim 1, wherein the configuration information for adding an SN/PSCell further comprises at least one of:

a Secondary Cell Group (SCG) counter; and an Identifier (ID) of at least one SN/PSCell.

8. A condition-based method for adding a Secondary Node (SN) or a Primary Secondary Cell (PSCell), applied to a Master Node (MN), comprising:

sending configuration information for adding an SN/PSCell to a terminal device, wherein the configuration information for adding an SN/PSCell comprises at least one of: addition condition configuration information of the SN/PSCell, wherein the addition condition configuration information of the SN/PSCell comprises a plurality pieces of addition condition configuration information configured for a plurality of SNs/PSCells respectively, each of the plurality of pieces of the addition condition configuration information is determined by a corresponding one of the plurality of SNs; or configuration information of the SN/PSCell, wherein the configuration information of the SN/PSCell comprises configuration information of a default PSCell;

when the MN is a New Radio (NR) base station, if the SN is a Long Term Evolution (LTE) base station, the addition condition configuration information of the SN/PSCell is based on a B1 event, when the MN is an NR base station, if the SN is an NR base station, the addition condition configuration information of the SN/PSCell is based on an A4 event, when the MN is an LTE base station, if the SN is an LTE base station, the addition condition configuration information of the SN/PSCell is based on an A4 event, and when the MN is an LTE base station, if the SN is an NR base station, the addition condition configuration information of the SN/PSCell is based on a B1 event.

9. The method of claim 8, wherein the addition condition configuration information of the SN/PSCell further comprises:

same addition condition configuration information configured for all SNs/PSCells, wherein the configuration information of the SN/PSCell further comprises at least one of:

configuration information of at least one PSCell in the SN and corresponding PSCell condition configuration information; or configuration information of at least one SCell in the SN.

10. The method of claim 9, wherein if the addition condition configuration information of the SN/PSCell is configured by the SN, the addition condition configuration information of the SN/PSCell is based on A3 and B5 events, if the addition condition configuration information of the SN/PSCell is configured by the MN, the addition condition configuration information of the SN/PSCell is based on a B1 event.

11. A condition-based method for adding a Secondary Node (SN) or a Primary Secondary Cell (PSCell), applied to an SN, comprising:

sending configuration information for adding an SN/PSCell to a Master Node (MN), wherein the configuration information for adding an SN/PSCell comprises at least one of:

addition condition configuration information of the SN/PSCell, wherein the addition condition configuration information of the SN/PSCell comprises a plurality pieces of addition condition configuration information configured for a plurality of SNs/PSCells respectively, each of the plurality of pieces of the addition condition configuration information is determined by a corresponding one of the plurality of SNs; or configuration information of the SN/PSCell, wherein the configuration information of the SN/PSCell comprises configuration information of a default PSCell;

when a master node (MN) is a New Radio (NR) base station, if the SN is a Long Term Evolution (LTE) base station, the addition condition configuration information of the SN/PSCell is based on a B1 event, when the MN is an NR base station, if the SN is an NR base station, the addition condition configuration information of the SN/PSCell is based on an A4 event, when the MN is an LTE base station, if the SN is an LTE base station, the addition condition configuration information of the SN/PSCell is based on an A4 event, and when the MN is an LTE base station, if the SN is an NR base station, the addition condition configuration information of the SN/PSCell is based on a B1 event.

12. The method of claim 11, wherein the addition condition configuration information of the SN/PSCell further comprises:

same addition condition configuration information configured for all SNs/PSCells.

13. The method of claim 11, wherein the configuration information of the SN/PSCell further comprises at least one of:

configuration information of at least one PSCell in the SN and corresponding PSCell condition configuration information; or configuration information of at least one SCell in the SN.

14. The method of claim 11, before sending, further comprising:

receiving information sent by the MN, and determining the configuration information of the SN/PSCell according to the information sent by the MN, wherein the information sent by the MN comprises at least one of:

addition condition configuration information of the SN/PSCell;

a measurement result of a terminal device;

a condition addition instruction of the SN/PSCell, the condition addition instruction being configured to inform the SN to generate the configuration information of the SN/PSCell according to the measurement result of the terminal device;

an Identifier (ID) of at least one candidate SN/PSCell;

a key of the SN/PSCell; or configuration information of at least one Secondary Cell (SCell) in the SN.

15. The method of claim 11, further comprising:

receiving information sent by the MN, and determining the configuration information for adding an SN/PSCell according to the information sent by the MN, wherein the information sent by the MN comprises at least one of:

the measurement result of the terminal device; or a configuration information instruction, the configuration information instruction being configured to inform the SN to generate the configuration information for adding an SN/PSCell according to the measurement result of the terminal device, wherein the information sent by the MN further comprises: a key of the SN/PSCell.

16. The method of claim 11, wherein if the addition condition configuration information of the SN/PSCell is configured by the SN, the addition condition configuration information of the SN/PSCell is based on A3 and B5 events, if the addition condition configuration information of the SN/PSCell is configured by the MN, the addition condition configuration information of the SN/PSCell is based on a B1 event, wherein the method further comprises:

sending a first General Packet Radio Service (GPRS) Tunnelling Protocol (GTP) tunnel establishment request to the MN, the first GTP tunnel establishment request comprising GTP tunnel IDs allocated by the SN to the MN and Access and Mobility Management Function/User Plane Function (AMF/UPF); and receiving a first GTP tunnel establishment confirmation message sent by the MN, the first GTP tunnel establishment confirmation message comprising a GTP tunnel ID allocated by the MN to the AMF/UPF and a GTP tunnel ID allocated by the AMF/UPF to the SN.

17. The method of claim 11, further comprising:

sending a first GTP tunnel activation request to an MN; and receiving a first GTP tunnel activation confirmation message sent by the MN, wherein the method further comprises at least one of:

receiving data forwarded by the MN, or receiving data forwarded by the AMF/UPF.

18. A terminal device, comprising:

a memory for storing instructions; and a transceiver, configured to receive configuration information for adding a Secondary Node/Primary Secondary Cell (SN/PSCell); and a processor, configured to execute the instructions to add an SN/PSCell using the configuration information for adding an SN/PSCell, wherein the configuration information for adding an SN/PSCell comprises at least one of:

addition condition configuration information of the SN/PSCell, wherein the addition condition configuration information of the SN/PSCell comprises a plurality pieces of addition condition configuration information configured for a plurality of SNs/PSCells respectively, each of the plurality of pieces of the addition condition configuration information is determined by a corresponding one of the plurality of SNs; or configuration information of the SN/PSCell, wherein the configuration information of the SN/PSCell comprises configuration information of a default PSCell;

when a master node (MN) is a New Radio (NR) base station, if the SN is a Long Term Evolution (LTE) base station, the addition condition configuration information of the SN/PSCell is based on a B1 event, when the MN is an NR base station, if the SN is an NR base station, the addition condition configuration information of the SN/PSCell is based on an A4 event, when the MN is an LTE base station, if the SN is an LTE base station, the addition condition configuration information of the SN/PSCell is based on an A4 event, and when the MN is an LTE base station, if the SN is an NR base station, the addition condition configuration information of the SN/PSCell is based on a B1 event.

19. A network device, comprising:

a transceiver, configured to send configuration information for adding a Secondary Node/Primary Secondary Cell (SN/PSCell) to a terminal device, wherein the configuration information for adding an SN/PSCell comprises at least one of:

addition condition configuration information of the SN/PSCell, wherein the addition condition configuration information of the SN/PSCell comprises a plurality pieces of addition condition configuration information configured for a plurality of SNs/PSCells respectively, each of the plurality of pieces of the addition condition configuration information is determined by a corresponding one of the plurality of SNs; or configuration information of the SN/PSCell, wherein the configuration information of the SN/PSCell comprises configuration information of a default PSCell;

when a master node (MN) is a New Radio (NR) base station, if the SN is a Long Term Evolution (LTE) base station, the addition condition configuration information of the SN/PSCell is based on a B1 event, when the MN is an NR base station, if the SN is an NR base station, the addition condition configuration information of the SN/PSCell is based on an A4 event, when the MN is an LTE base station, if the SN is an LTE base station, the addition condition configuration information of the SN/PSCell is based on an A4 event, and when the MN is an LTE base station, if the SN is an NR base station, the addition condition configuration information of the SN/PSCell is based on a B1 event.

20. A network device, comprising:

a transceiver, configured to send configuration information for adding a Secondary Node/Primary Secondary Cell (SN/PSCell) to a Master Node (MN), wherein the configuration information for adding an SN/PSCell comprises at least one of:

addition condition configuration information of the SN/PSCell, wherein the addition condition configuration information of the SN/PSCell comprises a plurality pieces of addition condition configuration information configured for a plurality of SNs/PSCells respectively, each of the plurality of pieces of the addition condition configuration information is determined by a corresponding one of the plurality of SNs; or configuration information of the SN/PSCell, wherein the configuration information of the SN/PSCell comprises configuration information of a default PSCell;

when the MN is a New Radio (NR) base station, if the SN is a Long Term Evolution (LTE) base station, the addition condition configuration information of the SN/PSCell is based on a B1 event, when the MN is an NR base station, if the SN is an NR base station, the addition condition configuration information of the SN/PSCell is based on an A4 event, when the MN is an LTE base station, if the SN is an LTE base station, the addition condition configuration information of the SN/PSCell is based on an A4 event, and when the MN is an LTE base station, if the SN is an NR base station, the addition condition configuration information of the SN/PSCell is based on a B1 event.

* * * * *